US012067932B2

(12) United States Patent
Hudson et al.

(10) Patent No.: US 12,067,932 B2
(45) **Date of Patent: *Aug. 20, 2024**

(54) SYSTEM AND METHOD FOR MODULATING AN ARRAY OF EMISSIVE ELEMENTS

(71) Applicant: GOOGLE LLC, Mountain View, CA (US)

(72) Inventors: Edwin Lyle Hudson, San Jose, CA (US); Robert Lo, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,909

(22) Filed: Apr. 10, 2023

(65) Prior Publication Data

US 2023/0335047 A1 Oct. 19, 2023

Related U.S. Application Data

(63) Continuation of application No. 17/178,576, filed on Feb. 18, 2021, now Pat. No. 11,626,062.
(Continued)

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0847* (2013.01);
(Continued)

(58) Field of Classification Search
CPC ............................... G09G 3/32; G09G 3/3426
(Continued)

(56) References Cited

U.S. PATENT DOCUMENTS

| | | | |
|---|---|---|---|
| 2,403,731 | A | 7/1946 | Macneille |
| 3,936,817 | A | 2/1976 | Levy et al. |

(Continued)

FOREIGN PATENT DOCUMENTS

| | | | |
|---|---|---|---|
| EP | 0658870 | A2 | 6/1995 |
| EP | 1187087 | A1 | 3/2002 |

(Continued)

OTHER PUBLICATIONS

U.S. Appl. No. 17/178,576, filed Feb. 18, 2021, Allowed.

(Continued)

*Primary Examiner* — Prabodh M Dharia
(74) *Attorney, Agent, or Firm* — Brake Hughes Bellermann LLP

(57) ABSTRACT

A backplane operative to drive an array of emissive pixel elements forming a part of an automotive head lamp assembly is disclosed. Each pixel element comprises a memory cell operative to pulse width modulate a current mirror pixel drive circuit configured to drive an emissive element. The array of emissive pixel elements is divided into a plurality of interdigitated rows or columns serviced by independent row drivers or independent column drivers that may be driven by data selected to randomize the order in which the data on adjacent pixels of the same row are written, thereby effectively substantially reducing the visibility of any residual structures that may be present in the data driving the pixels of adjacent columns.

20 Claims, 26 Drawing Sheets

Related U.S. Application Data

(60) Provisional application No. 62/977,897, filed on Feb. 18, 2020.

(52) U.S. Cl.
CPC ............... *G09G 2310/0275* (2013.01); *G09G 2320/0247* (2013.01); *G09G 2380/10* (2013.01)

(58) Field of Classification Search
USPC .......................................... 345/55, 522, 692
See application file for complete search history.

(56) References Cited

U.S. PATENT DOCUMENTS

| | | | |
|---|---|---|---|
| 4,432,610 | A | 2/1984 | Kobayashi et al. |
| 4,825,201 | A | 4/1989 | Watanabe et al. |
| 4,923,285 | A | 5/1990 | Ogino et al. |
| 4,996,523 | A | 2/1991 | Bell et al. |
| 5,018,838 | A | 5/1991 | Barnes et al. |
| 5,144,418 | A | 9/1992 | Brown et al. |
| 5,157,387 | A | 10/1992 | Momose et al. |
| 5,189,406 | A | 2/1993 | Humphries et al. |
| 5,317,334 | A | 5/1994 | Sano |
| 5,359,342 | A | 10/1994 | Nakai et al. |
| 5,471,225 | A | 11/1995 | Parks |
| 5,473,338 | A | 12/1995 | Prince et al. |
| 5,497,172 | A | 3/1996 | Doherty et al. |
| 5,537,128 | A | 7/1996 | Keene et al. |
| 5,548,347 | A | 8/1996 | Melnik et al. |
| 5,566,010 | A | 10/1996 | Ishii et al. |
| 5,602,559 | A | 2/1997 | Kimura |
| 5,619,228 | A | 4/1997 | Doherty |
| 5,731,802 | A | 3/1998 | Aras et al. |
| 5,751,264 | A | 5/1998 | Cavallerano et al. |
| 5,767,832 | A | 6/1998 | Koyama et al. |
| 5,818,413 | A | 10/1998 | Hayashi et al. |
| 5,905,482 | A | 5/1999 | Hughes et al. |
| 5,926,158 | A | 7/1999 | Yoneda et al. |
| 5,926,162 | A | 7/1999 | Wood et al. |
| 5,936,603 | A | 8/1999 | Lippmann et al. |
| 5,936,604 | A | 8/1999 | Endou |
| 5,945,972 | A | 8/1999 | Okumura et al. |
| 5,959,598 | A | 9/1999 | McKnight |
| 5,969,512 | A | 10/1999 | Matsuyama |
| 5,969,701 | A | 10/1999 | Numao et al. |
| 5,986,640 | A | 11/1999 | Baldwin et al. |
| 6,005,558 | A | 12/1999 | Hudson et al. |
| 6,034,659 | A | 3/2000 | Wald et al. |
| 6,046,716 | A | 4/2000 | McKnight |
| 6,067,065 | A | 5/2000 | Worley et al. |
| 6,121,948 | A | 9/2000 | Worley et al. |
| 6,127,991 | A | 10/2000 | Uehara et al. |
| 6,144,356 | A | 11/2000 | Weatherford et al. |
| 6,151,011 | A | 11/2000 | Worley et al. |
| RE37,056 | E | 2/2001 | Wortel et al. |
| 6,201,521 | B1 | 3/2001 | Doherty |
| 6,262,703 | B1 | 7/2001 | Perner |
| 6,285,360 | B1 | 9/2001 | Li |
| 6,297,788 | B1 | 10/2001 | Shigeta et al. |
| 6,317,112 | B1 | 11/2001 | Handschy et al. |
| 6,369,782 | B2 | 4/2002 | Shigeta |
| 6,424,330 | B1 | 7/2002 | Johnson |
| 6,456,267 | B1 | 9/2002 | Sato et al. |
| 6,476,792 | B2 | 11/2002 | Hattori et al. |
| 6,518,945 | B1 | 2/2003 | Pinkham |
| 6,567,138 | B1 | 5/2003 | Krusius et al. |
| 6,587,084 | B1 | 7/2003 | Alymov et al. |
| 6,603,452 | B1 | 8/2003 | Serita |
| 6,621,488 | B1 | 9/2003 | Takeuchi et al. |
| 6,690,432 | B2 | 2/2004 | Janssen et al. |
| 6,717,561 | B1 | 4/2004 | Pfeiffer et al. |
| 6,731,306 | B2 | 5/2004 | Booth et al. |
| 6,744,415 | B2 | 6/2004 | Waterman et al. |
| 6,762,739 | B2 | 7/2004 | Bone |
| 6,784,898 | B2 | 8/2004 | Lee et al. |
| 6,788,231 | B1 | 9/2004 | Hsueh |
| 6,806,871 | B1 | 10/2004 | Yasue |
| 6,831,626 | B2 | 12/2004 | Nakamura et al. |
| 6,850,216 | B2 | 2/2005 | Akimoto et al. |
| 6,862,012 | B1 | 3/2005 | Funakoshi et al. |
| 6,924,824 | B2 | 8/2005 | Adachi et al. |
| 6,930,667 | B1 | 8/2005 | Iijima et al. |
| 6,930,692 | B1 | 8/2005 | Coker et al. |
| 7,066,605 | B2 | 6/2006 | Dewald et al. |
| 7,067,853 | B1 | 6/2006 | Yao |
| 7,088,325 | B2 | 8/2006 | Ishii |
| 7,088,329 | B2 | 8/2006 | Hudson |
| 7,129,920 | B2 | 10/2006 | Chow |
| 7,187,355 | B2 | 3/2007 | Tam et al. |
| 7,379,043 | B2 | 5/2008 | Worley et al. |
| 7,397,980 | B2 | 7/2008 | Frisken |
| 7,443,374 | B2 | 10/2008 | Hudson |
| 7,468,717 | B2 | 12/2008 | Hudson |
| 7,692,671 | B2 | 4/2010 | Ng |
| 7,852,307 | B2 | 12/2010 | Hudson |
| 7,990,353 | B2 | 8/2011 | Chow |
| 8,040,311 | B2 | 10/2011 | Hudson et al. |
| 8,111,271 | B2 | 2/2012 | Hudson et al. |
| 8,264,507 | B2 | 9/2012 | Hudson et al. |
| 8,421,828 | B2 | 4/2013 | Hudson et al. |
| 8,643,681 | B2 | 2/2014 | Endo et al. |
| 9,047,818 | B1 | 6/2015 | Day et al. |
| 9,117,746 | B1 | 8/2015 | Clark et al. |
| 9,406,269 | B2 | 8/2016 | Lo et al. |
| 9,583,031 | B2 | 2/2017 | Hudson et al. |
| 9,824,619 | B2 | 11/2017 | Hudson et al. |
| 9,918,053 | B2 | 3/2018 | Lo et al. |
| 10,437,402 | B1 | 10/2019 | Pan |
| 10,957,272 | B2 | 3/2021 | Li et al. |
| 2001/0013844 | A1 | 8/2001 | Shigeta |
| 2002/0024481 | A1 | 2/2002 | Kawabe et al. |
| 2002/0041266 | A1 | 4/2002 | Koyama et al. |
| 2002/0043610 | A1 | 4/2002 | Lee et al. |
| 2002/0135309 | A1 | 9/2002 | Okuda |
| 2002/0140662 | A1 | 10/2002 | Igarashi |
| 2002/0158825 | A1 | 10/2002 | Endo et al. |
| 2003/0058195 | A1 | 3/2003 | Adachi et al. |
| 2003/0156102 | A1 | 8/2003 | Kimura |
| 2003/0174117 | A1 | 9/2003 | Crossland et al. |
| 2003/0210257 | A1 | 11/2003 | Hudson et al. |
| 2004/0032636 | A1 | 2/2004 | Willis |
| 2004/0080482 | A1 | 4/2004 | Magendanz et al. |
| 2004/0125090 | A1 | 7/2004 | Hudson |
| 2004/0174328 | A1 | 9/2004 | Hudson |
| 2005/0001794 | A1 | 1/2005 | Nakanishi et al. |
| 2005/0001806 | A1 | 1/2005 | Ohmura |
| 2005/0052437 | A1 | 3/2005 | Hudson |
| 2005/0057466 | A1 | 3/2005 | Sala et al. |
| 2005/0062765 | A1 | 3/2005 | Hudson |
| 2005/0088462 | A1 | 4/2005 | Borel |
| 2005/0195894 | A1 | 9/2005 | Kim et al. |
| 2005/0200300 | A1 | 9/2005 | Yumoto |
| 2005/0264586 | A1 | 12/2005 | Kim |
| 2006/0012589 | A1 | 1/2006 | Hsieh et al. |
| 2006/0012594 | A1 | 1/2006 | Worley et al. |
| 2006/0044220 | A1* | 3/2006 | Van Dijk ............ G09G 3/2014 345/55 |
| 2006/0066645 | A1 | 3/2006 | Ng |
| 2006/0147146 | A1 | 7/2006 | Voigt et al. |
| 2006/0208961 | A1 | 9/2006 | Nathan et al. |
| 2006/0284903 | A1 | 12/2006 | Ng |
| 2006/0284904 | A1 | 12/2006 | Ng |
| 2007/0252855 | A1 | 11/2007 | Hudson |
| 2007/0252856 | A1 | 11/2007 | Hudson et al. |
| 2008/0007576 | A1 | 1/2008 | Ishii et al. |
| 2008/0088613 | A1 | 4/2008 | Hudson et al. |
| 2008/0158437 | A1 | 7/2008 | Arai et al. |
| 2008/0259019 | A1 | 10/2008 | Ng |
| 2009/0021455 | A1 | 1/2009 | Miller et al. |
| 2009/0027360 | A1 | 1/2009 | Kwan et al. |
| 2009/0027364 | A1 | 1/2009 | Kwan et al. |
| 2009/0115703 | A1 | 5/2009 | Cok |
| 2009/0284671 | A1 | 11/2009 | Leister |

(56) References Cited

U.S. PATENT DOCUMENTS

| | | | | |
|---|---|---|---|---|
| 2009/0303248 | A1 | 12/2009 | Ng | |
| 2010/0073270 | A1 | 3/2010 | Ishii et al. | |
| 2010/0214646 | A1 | 8/2010 | Sugimoto et al. | |
| 2010/0253995 | A1 | 10/2010 | Reichelt | |
| 2010/0295836 | A1 | 11/2010 | Matsumoto et al. | |
| 2011/0109299 | A1 | 5/2011 | Chaji et al. | |
| 2011/0109670 | A1 | 5/2011 | Sempel et al. | |
| 2011/0199405 | A1 | 8/2011 | Dallas et al. | |
| 2011/0205100 | A1 | 8/2011 | Bogaerts | |
| 2011/0227887 | A1 | 9/2011 | Dallas et al. | |
| 2012/0086733 | A1 | 4/2012 | Hudson et al. | |
| 2012/0113167 | A1 | 5/2012 | Margerm et al. | |
| 2013/0038585 | A1 | 2/2013 | Kasai | |
| 2013/0308057 | A1 | 11/2013 | Lu et al. | |
| 2014/0085426 | A1 | 3/2014 | Leone et al. | |
| 2014/0092105 | A1 | 4/2014 | Guttag et al. | |
| 2014/0368561 | A1* | 12/2014 | Liao | G09G 3/2014 345/692 |
| 2015/0245038 | A1 | 8/2015 | Clatanoff et al. | |
| 2016/0203801 | A1 | 7/2016 | De Groot et al. | |
| 2016/0365055 | A9 | 12/2016 | Hudson et al. | |
| 2018/0061302 | A1 | 3/2018 | Hu et al. | |
| 2018/0182279 | A1* | 6/2018 | Sakariya | G09G 3/2088 |
| 2019/0114987 | A1* | 4/2019 | Li | G09G 3/3233 |
| 2019/0347994 | A1 | 11/2019 | Lin et al. | |
| 2020/0098307 | A1* | 3/2020 | Li | G09G 3/32 |
| 2021/0201771 | A1* | 7/2021 | Li | G09G 3/32 |

FOREIGN PATENT DOCUMENTS

| | | | |
|---|---|---|---|
| GB | 2327798 | A | 2/1999 |
| JP | 7049663 | A | 2/1995 |
| JP | 2002116741 | A | 4/2002 |
| TW | 227005 | B | 7/1994 |
| TW | 407253 | B | 10/2000 |
| TW | 418380 | B | 1/2001 |
| TW | 482991 | B | 4/2002 |
| TW | 483282 | B | 4/2002 |
| TW | 200603192 | A | 1/2006 |
| WO | 0070376 | A1 | 11/2000 |
| WO | 0152229 | A1 | 7/2001 |
| WO | 2007127849 | A2 | 11/2007 |
| WO | 2007127852 | A2 | 11/2007 |
| WO | 2012088011 | A1 | 6/2012 |

OTHER PUBLICATIONS

"2114A 1024 x4 Bit Static RAM", Component Data Catalog, Intel Corp., Santa Clara, CA, USA, 1982, 7 pages.

"Sony 3D", screen capture from video clip, 2009, 2 pages.

Amon, et al., "PTAT Sensors Based on SJFETs", 10th Mediterranean Electrotechnical Conference, MEleCon, vol. II, 2000, pp. 802-805.

Anderson, et al., "Holographic Data Storage: Science Fiction or Science Fact", Akonia Holographics LLC, presented at Optical Data Storage, 2014, 8 pages.

Armitage, et al., "Introduction to Microdisplays", John Wiley & Sons, 2006, pp. 182-185.

Baker, "CMOS Circuit Design, Layout, and Simulation", IEEE Press Series on Microelectronic Systems, John Wiley & Sons, Inc., Publication, 2010, pp. 614-616.

Colgan, et al., "On-Chip Metallization Layers for Reflective Light Waves", Journal of Research Development, vol. 42. No. 3/4, May-Jul. 1998, pp. 339-345.

CSE370, "Flip-Flops", Lecture 14, https://studylib.net/doc/18055423/flip-flops, no date, pp. 1-17.

Dai, et al., "Characteristics of LCoS Phase-only spatial light modulator and its applications", Optics Communications vol. 238, especially section 3.2, 2004, pp. 269-276.

Drabik, "Optically Interconnected Parallel Processor Arrays", A Thesis, Georgia Institute of Technology, Dec. 1989, pp. 121-126.

Fuller, "Static Random Access Memory—SRAM", Rochester Institute of technology to Microelectronic Engineering, Nov. 18, 2016, pp. 1-39.

Hu, "Complementary MOS (CMOS) Technology", Feb. 13, 2009, pp. 198-200.

Jesacher, et al., "Broadband suppression of the zero diffraction order of an SLM using its extended phase modulation range", Optics Express, vol. 22, No. 14, Jul. 14, 2014, pp. 17590-17599.

Kang, et al., "Digital Driving of TN-LC for WUXGA LCOS Panel", Digest of Technical Papers, Society for Information Display, 2001, pp. 1264-1267.

Nakamura, et al., "Modified drive method for OCB LSD", Proceeding of the International Display Research Conference, Society for Information Display, Campbell, CA, US, 1997, 4 pages.

Ong, "Modern Mos Technology: Processes, Devices, and Design", McGraw-Hill Book Company, 1984, pp. 207-212.

Oton, et al., "Multipoint phase calibration for improved compensation of inherent wavefront distortion in parallel aligned liquid crystal on silicon display", Applied Optics, vol. 46, No. 23, Optical Society of America, 2007, pp. 5667-5679.

Pelgrom, et al., "Matching Properties of MOS Transistors", IEEE Journal of Solid-State Circuits, vol. 23, No. 5, Oct. 1989, 8 pages.

Potter, et al., "Optical correlation using a phase-only liquid crystal over silicon spatial light modulator", SPIE 1564 Opt. Info. Proc. Sys & Arch. III;, 1991, pp. 363-372.

Product Description, "Westar's Microdisplay Inspection System", www.westar.com/mdis, Jan. 2000, 2 pages.

Rabaey, et al., "Digital Integrated Circuits", A Design Perspective, Second Edition, Saurabh Printers Pvt. Ltd, 2016, pp. 138-140.

Rabaey, "The Devices Chapter 3", Jan. 18, 2002, pp. 121-124.

Robinson, et al., "Polarization Engineering for LCD Projection", John Wiley and Sons, Ltd., Chichester, England, 2005, pp. 121-123.

Sloof, et al., "An Improved WXGA LCOS Imager for Single Panel Systems", Proceedings of the Asia Symposium on Information Display, Society for Information Display, Campbell, CA, US, 2004, 4 pages.

SMPTE 274M-2005, "1920 x 1080 Image Sample Structure, Digital Representation and Digital Timing Reference Sequences for Multiple Picture Rates", SMPTE, White Plains, New York, US, 2005, 29 pages.

Underwood, et al., "Evaluation of an nMOS VLSI array for an adaptive liquid-crystal spatial light modulator", IEEE Proc, v.133 PI.J. No. , Feb. 1986, 15 pages.

Wang, "Studies of Liquid Crystal Response Time", University of Central Florida, Doctoral Dissertation, 2005, 128 pages.

Wu, "Discussion #9 MOSFETs", University of California at Berkeley College of Engineering Department of Electrical Engineering and Computer Sciences, Spring 2008, pp. 1-7.

* cited by examiner

| | Time Interval 1 | | | | Time Interval 2 | | | | Time Interval 3 | | | | Time Interval 4 | | | | Time Interval 5 | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | | | | | | | | | | | | | | | | | | | |
| 2 | | A2 | | | A1 | | | | | | | | | | | | | | | |
| 3 | | | | | | A2 | | | A1 | | | | | | | | | | | |
| 4 | | | A3 | | | | | | | A2 | | | A1 | | | | | | | |
| 5 | | | | | | | A3 | | | | | | | A2 | | | A1 | | | |
| 6 | | | | | | | | | | | A3 | | | | | | | A2 | | |
| 7 | | | | | | | | | | | | | | | A3 | | | | | |
| 8 | | | | A4 | | | | | | | | | | | | | | | A3 | |
| 9 | | | | | | | | A4 | | | | | | | | | | | | |
| 10 | | | | | | | | | | | | A4 | | | | | | | | |
| 11 | | | | | | | | | | | | | | | | A4 | | | | |
| 12 | | | | | | | | | | | | | | | | | | | | A4 |
| 13 | | | | | | | | | | | | | | | | | | | | |
| 14 | | | | | | | | | | | | | | | | | | | | |

Row

Time →

FIG. 3

| Time → | FIRST TIME INTERVAL | | SECOND TIME INTERVAL | |
|---|---|---|---|---|
| ROW↓ | ODD COLUMN | EVEN COLUMN | ODD COLUMN | EVEN COLUMN |
| 1 | A1 | | | |
| 2 | A2 | | A1 | |
| 3 | | | A2 | |
| 4 | A3 | B5 | | |
| 5 | | | A3 | B5 |
| 6 | | | | |
| 7 | | | | |
| 8 | A4 | | | |
| 9 | | | A4 | |
| 10 | | | | |
| 11 | | | | |
| 12 | | | | |
| 13 | | | | |
| 14 | | | | B1 |
| 15 | | | | B2 |
| 16 | A5 | B3 | | |
| 17 | | | A5 | B3 |
| 18 | | | | |
| 19 | | | | |
| 20 | | B4 | | |
| 21 | | | | B4 |
| 22 | | | | |
| 23 | | | | |
| 24 | | | | |

FIG. 4A

| Time → | FIRST TIME INTERVAL | | | |
|---|---|---|---|---|
| ROW ↓ | ODD COLUMN 1 | EVEN COLUMN 2 | ODD COLUMN 3 | EVEN COLUMN 4 |
| 1 | A1 | | | |
| 2 | A2 | | | D4 |
| 3 | | | | |
| 4 | A3 | B5 | | |
| 5 | | | | |
| 6 | | | C1 | |
| 7 | | | C2 | |
| 8 | A4 | | | |
| 9 | | | C3 | |
| 10 | | | | D5 |
| 11 | | | | |
| 12 | | | | |
| 13 | | B1 | C4 | |
| 14 | | B2 | | |
| 15 | | | | |
| 16 | A5 | B3 | | |
| 17 | | | | |
| 18 | | | | |
| 19 | | | | D1 |
| 20 | | B4 | | D2 |
| 21 | | | C5 | |
| 22 | | | | D3 |
| 23 | | | | |
| 24 | | | | |

FIG. 4B

| Time → | SECOND TIME INTERVAL | | | |
|---|---|---|---|---|
| ROW ↓ | ODD COLUMN 1 | EVEN COLUMN 2 | ODD COLUMN 3 | EVEN COLUMN 4 |
| 1 | | | | |
| 2 | A1 | | | |
| 3 | A2 | | | D4 |
| 4 | | | | |
| 5 | A3 | B5 | | |
| 6 | | | | |
| 7 | | | C1 | |
| 8 | | | C2 | |
| 9 | A4 | | | |
| 10 | | | C3 | |
| 11 | | | | D5 |
| 12 | | | | |
| 13 | | | | |
| 14 | | B1 | C4 | |
| 15 | | B2 | | |
| 16 | | | | |
| 17 | A5 | B3 | | |
| 18 | | | | |
| 19 | | | | |
| 20 | | | | D1 |
| 21 | | B4 | | D2 |
| 22 | | | C5 | |
| 23 | | | | D3 |
| 24 | | | | |

FIG. 4C

| | Time Intervals→ | | | | | | | | | | | | | | | | | | | |
|---|---|---|---|---|---|---|---|---|---|---|---|---|---|---|---|---|---|---|---|---|
| | 1 | | 2 | | 3 | | 4 | | 5 | | 6 | | 7 | | 8 | | 9 | | 10 | |
| 1 | A1 | | | | | | | | | | | | | B4 | | | | | | |
| 2 | A2 | | A1 | | | | | | | | | | | | | B4 | | | | |
| 3 | | | A2 | | A1 | | | | | | | | | | | | | B4 | | |
| 4 | A3 | B5 | | | A2 | | A1 | | | | | | | | | | | | | B4 |
| 5 | | | A3 | B5 | | | A2 | | A1 | | | | | | | | | | | |
| 6 | | | | | A3 | B5 | | | A2 | | A1 | | | | | | | | | |
| 7 | | | | | | | A3 | B5 | | | A2 | | A1 | | | | | | | |
| 8 | A4 | | | | | | | | A3 | B5 | | | A2 | | A1 | | | | | |
| 9 | | | A4 | | | | | | | | A3 | B5 | | | A2 | | A1 | | | |
| 10 | | | | | A4 | | | | | | | | A3 | B5 | | | A2 | | A1 | |
| 11 | | | | | | | A4 | | | | | | | | A3 | B5 | | | A2 | |
| 12 | | | | | | | | | A4 | | | | | | | | A3 | B5 | | |
| 13 | | B1 | | | | | | | | | A4 | | | | | | | | A3 | B5 |
| 14 | | B2 | | B1 | | | | | | | | | A4 | | | | | | | |
| 15 | | | | B2 | | B1 | | | | | | | | | A4 | | | | | |
| 16 | A5 | B3 | | | | B2 | | B1 | | | | | | | | | A4 | | | |

FIG. 5A

| | Time Intervals→ | | | | | | | | | | | | | | | | | | | |
|---|---|---|---|---|---|---|---|---|---|---|---|---|---|---|---|---|---|---|---|---|
| | 1 | | 2 | | 3 | | 4 | | 5 | | 6 | | 7 | | 8 | | 9 | | 10 | |
| 17 | | | A5 | B3 | | | | B2 | | B1 | | | | | | | | | A4 | |
| 18 | | | | | A5 | B3 | | | | B2 | | B1 | | | | | | | | |
| 19 | | | | | | | A5 | B3 | | | | B2 | | B1 | | | | | | |
| 20 | | B4 | | | | | | | A5 | B3 | | | | B2 | | B1 | | | | |
| 21 | | | | B4 | | | | | | | A5 | B3 | | | | B2 | | B1 | | |
| 22 | | | | | | B4 | | | | | | | A5 | B3 | | | | B2 | | B1 |
| 23 | | | | | | | | B4 | | | | | | | A5 | B3 | | | | B2 |
| 24 | | | | | | | | | | B4 | | | | | | | A5 | B3 | | |
| | 2 | | 3 | | 4 | | 5 | | 6 | | 7 | | 8 | | 9 | | 10 | | 11 | |
| 1 | | | | | | | | | | | | B4 | | | | | | | A5 | B3 |
| 2 | A1 | | | | | | | | | | | | | B4 | | | | | | |
| 3 | A2 | | A1 | | | | | | | | | | | | | B4 | | | | |
| 4 | | | A2 | | A1 | | | | | | | | | | | | | B4 | | |
| 5 | A3 | B5 | | | A2 | | A1 | | | | | | | | | | | | | B4 |
| 6 | | | A3 | B5 | | | A2 | | A1 | | | | | | | | | | | |
| 7 | | | | | A3 | B5 | | | A2 | | A1 | | | | | | | | | |
| 8 | | | | | | | A3 | B5 | | | A2 | | A1 | | | | | | | |

FIG. 5B

| | Time Intervals→ | | | | | | | | | | | | | | | | | | | |
|---|---|---|---|---|---|---|---|---|---|---|---|---|---|---|---|---|---|---|---|---|
| | 11 | | 12 | | 13 | | 14 | | 15 | | 16 | | 17 | | 18 | | 19 | | 20 | |
| 1 | A5 | B3 | | | | B2 | | B1 | | | | | | | | | A4 | | | |
| 2 | | | A5 | B3 | | | | B2 | | B1 | | | | | | | | | A4 | |
| 3 | | | | | A5 | B3 | | | | B2 | | B1 | | | | | | | | |
| 4 | | | | | | | A5 | B3 | | | | B2 | | B1 | | | | | | |
| 5 | | B4 | | | | | | | A5 | B3 | | | | B2 | | B1 | | | | |
| 6 | | | | B4 | | | | | | | A5 | B3 | | | | B2 | | B1 | | |
| 7 | | | | | | B4 | | | | | | | A5 | B3 | | | | B2 | | B1 |
| 8 | | | | | | | | B4 | | | | | | | A5 | B3 | | | | B2 |
| 9 | | | | | | | | | | B4 | | | | | | | A5 | B3 | | |
| 10 | | | | | | | | | | | | B4 | | | | | | | A5 | B3 |
| 11 | A1 | | | | | | | | | | | | | B4 | | | | | | |
| 12 | A2 | | A1 | | | | | | | | | | | | | B4 | | | | |
| 13 | | | A2 | | A1 | | | | | | | | | | | | | B4 | | |
| 14 | A3 | B5 | | | A2 | | A1 | | | | | | | | | | | | | B4 |
| 15 | | | A3 | B5 | | | A2 | | A1 | | | | | | | | | | | |
| 16 | | | | | A3 | B5 | | | A2 | | A1 | | | | | | | | | |

FIG. 5C

| | Time Intervals→ | | | | | | | | | | | | | | | | | | | |
|---|---|---|---|---|---|---|---|---|---|---|---|---|---|---|---|---|---|---|---|---|
| | 11 | | 12 | | 13 | | 14 | | 15 | | 16 | | 17 | | 18 | | 19 | | 20 | |
| 17 | | | | | | | A3 | B5 | | | A2 | | A1 | | | | | | | |
| 18 | A4 | | | | | | | | A3 | B5 | | | A2 | | A1 | | | | | |
| 19 | | | A4 | | | | | | | | A3 | B5 | | | A2 | | A1 | | | |
| 20 | | | | | A4 | | | | | | | | A3 | B5 | | | A2 | | A1 | |
| 21 | | | | | | | A4 | | | | | | | | A3 | B5 | | | A2 | |
| 22 | | | | | | | | | A4 | | | | | | | | A3 | B5 | | |
| 23 | | B1 | | | | | | | | | A4 | | | | | | | | A3 | B5 |
| 24 | | B2 | | B1 | | | | | | | | | A4 | | | | | | | |
| | 12 | | 13 | | 14 | | 15 | | 16 | | 17 | | 18 | | 19 | | 20 | | 21 | |
| 1 | | | | B2 | | B1 | | | | | | | | | A4 | | | | | |
| 2 | A5 | B3 | | | | B2 | | B1 | | | | | | | | | A4 | | | |
| 3 | | | A5 | B3 | | | | B2 | | B1 | | | | | | | | | A4 | |
| 4 | | | | | A5 | B3 | | | | B2 | | B1 | | | | | | | | |
| 5 | | | | | | | A5 | B3 | | | | B2 | | B1 | | | | | | |
| 6 | | B4 | | | | | | | A5 | B3 | | | | B2 | | B1 | | | | |
| 7 | | | | B4 | | | | | | | A5 | B3 | | | | B2 | | B1 | | |
| 8 | | | | | | B4 | | | | | | | A5 | B3 | | | | B2 | | B1 |

FIG. 5D

| | Time Intervals→ | | | | | | | | | | | |
|---|---|---|---|---|---|---|---|---|---|---|---|---|
| Rows↓ | 1 | 2 | 3 | 4 | 5 | 6 | 7 | 8 | 9 | 10 | 11 | 12 |
| 1 | A1 | | | | A13 | A12 | | | | A11 | | |
| 2 | | A1 | | | | A13 | A12 | | | | A11 | |
| 3 | | | A1 | | | | A13 | A12 | | | | A11 |
| 4 | | | | A1 | | | | A13 | A12 | | | |
| 5 | A2 | | | | A1 | | | | A13 | A12 | | |
| 6 | | A2 | | | | A1 | | | | A13 | A12 | |
| 7 | A3 | | A2 | | | | A1 | | | | A13 | A12 |
| 8 | | A3 | | A2 | | | | A1 | | | | A13 |
| 9 | | | A3 | | A2 | | | | A1 | | | |
| 10 | | | | A3 | | A2 | | | | A1 | | |
| 11 | A4 | | | | A3 | | A2 | | | | A1 | |
| 12 | | A4 | | | | A3 | | A2 | | | | A1 |
| 13 | | | A4 | | | | A3 | | A2 | | | |
| 14 | | | | A4 | | | | A3 | | A2 | | |
| 15 | A5 | | | | A4 | | | | A3 | | A2 | |
| 16 | A6 | A5 | | | | A4 | | | | A3 | | A2 |
| 17 | | A6 | A5 | | | | A4 | | | | A3 | |
| 18 | | | A6 | A5 | | | | A4 | | | | A3 |
| 19 | | | | A6 | A5 | | | | A4 | | | |

FIG. 6A

| | Time Intervals→ | | | | | | | | | | | |
|---|---|---|---|---|---|---|---|---|---|---|---|---|
| Rows↓ | 1 | 2 | 3 | 4 | 5 | 6 | 7 | 8 | 9 | 10 | 11 | 12 |
| 20 | A7 | | | | A6 | A5 | | | | A4 | | |
| 21 | A8 | A7 | | | | A6 | A5 | | | | A4 | |
| 22 | | A8 | A7 | | | | A6 | A5 | | | | A4 |
| 23 | | | A8 | A7 | | | | A6 | A5 | | | |
| 24 | | | | A8 | A7 | | | | A6 | A5 | | |
| 25 | A9 | | | | A8 | A7 | | | | A6 | A5 | |
| 26 | | A9 | | | | A8 | A7 | | | | A6 | A5 |
| 27 | A10 | | A9 | | | | A8 | A7 | | | | A6 |
| 28 | | A10 | | A9 | | | | A8 | A7 | | | |
| 29 | | | A10 | | A9 | | | | A8 | A7 | | |
| 30 | | | | A10 | | A9 | | | | A8 | A7 | |
| 31 | A11 | | | | A10 | | A9 | | | | A8 | A7 |
| 32 | | A11 | | | | A10 | | A9 | | | | A8 |
| 33 | | | A11 | | | | A10 | | A9 | | | |
| 34 | | | | A11 | | | | A10 | | A9 | | |
| 35 | A12 | | | | A11 | | | | A10 | | A9 | |
| 36 | A13 | A12 | | | | A11 | | | | A10 | | A9 |
| 37 | | A13 | A12 | | | | A11 | | | | A10 | |
| 38 | | | A13 | A12 | | | | A11 | | | | A10 |
| 39 | | | | A13 | A12 | | | | A11 | | | |

FIG. 6B

| | Time Interval Comprising 13 Row Write Actions | | | | | | | | | | | | |
|---|---|---|---|---|---|---|---|---|---|---|---|---|---|
| Rows↓ | 1 | 2 | 3 | 4 | 5 | 6 | 7 | 8 | 9 | 10 | 11 | 12 | 13 |
| 1 | A1 | | | | | | | | | | | | |
| 2 | | | | | | | | | | | | | |
| 3 | | | | | | | | | | | | | |
| 4 | | | | | | | | | | | | | |
| 5 | | A2 | | | | | | | | | | | |
| 6 | | | | | | | | | | | | | |
| 7 | | | A3 | | | | | | | | | | |
| 8 | | | | | | | | | | | | | |
| 9 | | | | | | | | | | | | | |
| 10 | | | | | | | | | | | | | |
| 11 | | | | A4 | | | | | | | | | |
| 12 | | | | | | | | | | | | | |
| 13 | | | | | | | | | | | | | |
| 14 | | | | | | | | | | | | | |
| 15 | | | | | A5 | | | | | | | | |
| 16 | | | | | | A6 | | | | | | | |
| 17 | | | | | | | | | | | | | |
| 18 | | | | | | | | | | | | | |
| 19 | | | | | | | | | | | | | |

FIG. 6C

| | Time Interval Comprising 13 Row Write Actions | | | | | | | | | | | | |
|---|---|---|---|---|---|---|---|---|---|---|---|---|---|
| Rows↓ | 1 | 2 | 3 | 4 | 5 | 6 | 7 | 8 | 9 | 10 | 11 | 12 | 13 |
| 20 | | | | | | | A7 | | | | | | |
| 21 | | | | | | | | A8 | | | | | |
| 22 | | | | | | | | | | | | | |
| 23 | | | | | | | | | | | | | |
| 24 | | | | | | | | | | | | | |
| 25 | | | | | | | | | A9 | | | | |
| 26 | | | | | | | | | | | | | |
| 27 | | | | | | | | | | A10 | | | |
| 28 | | | | | | | | | | | | | |
| 29 | | | | | | | | | | | | | |
| 30 | | | | | | | | | | | | | |
| 31 | | | | | | | | | | | A11 | | |
| 32 | | | | | | | | | | | | | |
| 33 | | | | | | | | | | | | | |
| 34 | | | | | | | | | | | | | |
| 35 | | | | | | | | | | | | A12 | |
| 36 | | | | | | | | | | | | | A13 |
| 37 | | | | | | | | | | | | | |
| 38 | | | | | | | | | | | | | |
| 39 | | | | | | | | | | | | | |

FIG. 6D

| Virtual Row | Array Row | Virtual Row | Array Row | Virtual Row | Array Row | Virtual Row | Array Row |
|---|---|---|---|---|---|---|---|
| 0 | 0 | 264 | 22 | 528 | 44 | 792 | 66 |
| 1-11 | no-op | 265-275 | no-op | 529-539 | no-op | 793-803 | no-op |
| 12 | 1 | 276 | 23 | 540 | 45 | 804 | 67 |
| 13-23 | no-op | 277-287 | no-op | 541-551 | no-op | 805-815 | no-op |
| 24 | 2 | 288 | 24 | 552 | 46 | 816 | 68 |
| 25-35 | no-op | 289-299 | no-op | 553-563 | no-op | 817-827 | no-op |
| 36 | 3 | 300 | 25 | 564 | 47 | 828 | 69 |
| 37-47 | no-op | 301-311 | no-op | 565-575 | no-op | 829-839 | no-op |
| 48 | 4 | 312 | 26 | 576 | 48 | 840 | 70 |
| 49-59 | no-op | 313-323 | no-op | 577-587 | no-op | 841-851 | no-op |
| 60 | 5 | 324 | 27 | 588 | 49 | 852 | 71 |
| 61-71 | no-op | 325-335 | no-op | 589-599 | no-op | 853-863 | no-op |
| 72 | 6 | 336 | 28 | 600 | 50 | 864 | 72 |
| 73-83 | no-op | 337-347 | no-op | 601-611 | no-op | 865-875 | no-op |
| 84 | 7 | 348 | 29 | 612 | 51 | 876 | 73 |
| 85-95 | no-op | 349-359 | no-op | 613-623 | no-op | 877-887 | no-op |
| 96 | 8 | 360 | 30 | 624 | 52 | 888 | 74 |
| 97-107 | no-op | 361-371 | no-op | 625-635 | no-op | 889-899 | no-op |
| 108 | 9 | 372 | 31 | 636 | 53 | 900 | 75 |
| 109-119 | no-op | 373-383 | no-op | 637-647 | no-op | 901-911 | no-op |
| 120 | 10 | 384 | 32 | 648 | 54 | 912 | 76 |
| 121-131 | no-op | 385-395 | no-op | 649-659 | no-op | 913-923 | no-op |
| 132 | 11 | 396 | 33 | 660 | 55 | 924 | 77 |
| 133-143 | no-op | 397-407 | no-op | 661-671 | no-op | 925-935 | no-op |
| 144 | 12 | 408 | 34 | 672 | 56 | 936 | 78 |
| 145-155 | no-op | 409-419 | no-op | 673-683 | no-op | 937-947 | no-op |
| 156 | 13 | 420 | 35 | 684 | 57 | 948 | 79 |
| 157-167 | no-op | 421-431 | no-op | 685-695 | no-op | 949-959 | no-op |
| 168 | 14 | 432 | 36 | 696 | 58 | 960 | 80 |
| 169-179 | no-op | 433-443 | no-op | 697-707 | no-op | 961-971 | no-op |
| 180 | 15 | 444 | 37 | 708 | 59 | 972 | 81 |
| 181-191 | no-op | 445-455 | no-op | 709-719 | no-op | 973-983 | no-op |
| 192 | 16 | 456 | 38 | 720 | 60 | 984-1023 | no-op |
| 193-203 | no-op | 457-467 | no-op | 721-731 | no-op | | |
| 204 | 17 | 468 | 39 | 732 | 61 | Alternative | |
| 205-215 | no-op | 469-479 | no-op | 733-743 | no-op | 984 | 82 |
| 216 | 18 | 480 | 40 | 744 | 62 | 985-995 | no-op |
| 217-227 | no-op | 481-491 | no-op | 745-755 | no-op | 996 | 683 |
| 228 | 19 | 492 | 41 | 756 | 63 | 997-1007 | no-op |
| 229-239 | no-op | 493-503 | no-op | 757-767 | no-op | 1008 | 84 |
| 240 | 20 | 504 | 42 | 768 | 64 | 1009-1019 | no-op |
| 241-251 | no-op | 505-515 | no-op | 769-779 | no-op | 1020-1023 | no-op |
| 252 | 21 | 516 | 43 | 780 | 65 | | |
| 253-263 | no-op | 517-527 | no-op | 781-791 | no-op | | |

FIG. 7A

| Virtual Row | Array Row | | Virtual Row | Array Row | | Virtual Row | Array Row | | Virtual Row | Array Row |
|---|---|---|---|---|---|---|---|---|---|---|
| 0 | 0 | | 132 | 22 | | 264 | 44 | | 396 | 66 |
| 1-5 | no-op | | 133-137 | no-op | | 265-269 | no-op | | 397-401 | no-op |
| 6 | 1 | | 138 | 23 | | 270 | 45 | | 402 | 67 |
| 7-11 | no-op | | 139-143 | no-op | | 271-274 | no-op | | 403-407 | no-op |
| 12 | 2 | | 144 | 24 | | 276 | 46 | | 408 | 68 |
| 13-17 | no-op | | 145-149 | no-op | | 277-281 | no-op | | 409-413 | no-op |
| 18 | 3 | | 150 | 25 | | 282 | 47 | | 414 | 69 |
| 37-47 | no-op | | 151-135 | no-op | | 283-287 | no-op | | 415-419 | no-op |
| 24 | 4 | | 156 | 26 | | 288 | 48 | | 420 | 70 |
| 49-59 | no-op | | 157-161 | no-op | | 289-293 | no-op | | 421-425 | no-op |
| 30 | 5 | | 162 | 27 | | 294 | 49 | | 426 | 71 |
| 61-71 | no-op | | 163-167 | no-op | | 295-299 | no-op | | 427-431 | no-op |
| 36 | 6 | | 168 | 28 | | 300 | 50 | | 432 | 72 |
| 73-83 | no-op | | 169-173 | no-op | | 301-305 | no-op | | 433-437 | no-op |
| 42 | 7 | | 174 | 29 | | 306 | 51 | | 438 | 73 |
| 85-95 | no-op | | 175-179 | no-op | | 307-311 | no-op | | 439-443 | no-op |
| 48 | 8 | | 180 | 30 | | 312 | 52 | | 444 | 74 |
| 97-107 | no-op | | 181-185 | no-op | | 313-317 | no-op | | 445-449 | no-op |
| 54 | 9 | | 186 | 31 | | 318 | 53 | | 450 | 75 |
| 109-119 | no-op | | 187-191 | no-op | | 319-323 | no-op | | 451-455 | no-op |
| 60 | 10 | | 192 | 32 | | 324 | 54 | | 456 | 76 |
| 61-65 | no-op | | 193-197 | no-op | | 325-329 | no-op | | 457-461 | no-op |
| 66 | 11 | | 198 | 33 | | 330 | 55 | | 462 | 77 |
| 67-71 | no-op | | 199-407 | no-op | | 331-335 | no-op | | 463-467 | no-op |
| 72 | 12 | | 204 | 34 | | 336 | 56 | | 468 | 78 |
| 73-77 | no-op | | 205-209 | no-op | | 337-341 | no-op | | 469-473 | no-op |
| 78 | 13 | | 210 | 35 | | 342 | 57 | | 474 | 79 |
| 79-167 | no-op | | 211-215 | no-op | | 343-347 | no-op | | 475-479 | no-op |
| 84 | 14 | | 216 | 36 | | 348 | 58 | | 480 | 80 |
| 85-179 | no-op | | 217-221 | no-op | | 349-353 | no-op | | 481-485 | no-op |
| 90 | 15 | | 222 | 37 | | 354 | 59 | | 486 | 81 |
| 181-191 | no-op | | 223-227 | no-op | | 355-359 | no-op | | 487-491 | no-op |
| 96 | 16 | | 228 | 38 | | 360 | 60 | | 492-511 | no-op |
| 193-203 | no-op | | 229-233 | no-op | | 361-365 | no-op | | | |
| 102 | 17 | | 234 | 39 | | 366 | 61 | | | |
| 205-215 | no-op | | 235-239 | no-op | | 367-371 | no-op | | Alternative | |
| 108 | 18 | | 240 | 40 | | 372 | 62 | | 492 | 82 |
| 109-113 | no-op | | 241-245 | no-op | | 373-377 | no-op | | 493-497 | no-op |
| 114 | 19 | | 246 | 41 | | 378 | 63 | | 498 | 83 |
| 115-119 | no-op | | 247-251 | no-op | | 379-383 | no-op | | 499-503 | no-op |
| 120 | 20 | | 252 | 42 | | 384 | 64 | | 504 | 84 |
| 121-125 | no-op | | 253-257 | no-op | | 385-389 | no-op | | 505-509 | no-op |
| 126 | 21 | | 258 | 43 | | 390 | 65 | | 510-511 | no-op |
| 127-131 | no-op | | 259-263 | no-op | | 391-395 | no-op | | | |

FIG. 7B

| Virtual Row | Array Row | | Virtual Row | Array Row | | Virtual Row | Array Row | | Virtual Row | Array Row |
|---|---|---|---|---|---|---|---|---|---|---|
| 0 | 0 | | 44 | 22 | | 88 | 44 | | 132 | 66 |
| 1 | no-op | | 45 | no-op | | 89 | no-op | | 133 | no-op |
| 2 | 1 | | 46 | 23 | | 90 | 45 | | 134 | 67 |
| 3 | no-op | | 47 | no-op | | 91 | no-op | | 135 | no-op |
| 4 | 2 | | 48 | 24 | | 92 | 46 | | 136 | 68 |
| 5 | no-op | | 49 | no-op | | 93 | no-op | | 137 | no-op |
| 6 | 3 | | 50 | 25 | | 94 | 47 | | 138 | 69 |
| 7 | no-op | | 51 | no-op | | 95 | no-op | | 139 | no-op |
| 8 | 4 | | 52 | 26 | | 96 | 48 | | 140 | 70 |
| 9 | no-op | | 53 | no-op | | 97 | no-op | | 141 | no-op |
| 10 | 5 | | 54 | 27 | | 98 | 49 | | 142 | 71 |
| 11 | no-op | | 55 | no-op | | 99 | no-op | | 143 | no-op |
| 12 | 6 | | 56 | 28 | | 100 | 50 | | 144 | 72 |
| 13 | no-op | | 57 | no-op | | 101 | no-op | | 145 | no-op |
| 14 | 7 | | 58 | 29 | | 102 | 51 | | 146 | 73 |
| 15 | no-op | | 59 | no-op | | 103 | no-op | | 147 | no-op |
| 16 | 8 | | 60 | 30 | | 104 | 52 | | 148 | 74 |
| 17 | no-op | | 61 | no-op | | 105 | no-op | | 149 | no-op |
| 18 | 9 | | 62 | 31 | | 106 | 53 | | 150 | 75 |
| 19 | no-op | | 63 | no-op | | 107 | no-op | | 151 | no-op |
| 20 | 10 | | 64 | 32 | | 108 | 54 | | 152 | 76 |
| 21 | no-op | | 65 | no-op | | 109 | no-op | | 153 | no-op |
| 22 | 11 | | 66 | 33 | | 110 | 55 | | 154 | 77 |
| 23 | no-op | | 67 | no-op | | 111 | no-op | | 155 | no-op |
| 24 | 12 | | 68 | 34 | | 112 | 56 | | 156 | 78 |
| 25 | no-op | | 69 | no-op | | 113 | no-op | | 157 | no-op |
| 26 | 13 | | 70 | 35 | | 114 | 57 | | 158 | 79 |
| 27 | no-op | | 71 | no-op | | 115 | no-op | | 159 | no-op |
| 28 | 14 | | 72 | 36 | | 116 | 58 | | 160 | 80 |
| 29 | no-op | | 73 | no-op | | 117 | no-op | | 161 | no-op |
| 30 | 15 | | 74 | 37 | | 118 | 59 | | 162 | 81 |
| 31 | no-op | | 75 | no-op | | 119 | no-op | | 163 | no-op |
| 32 | 16 | | 76 | 38 | | 120 | 60 | | 164-180 | no-op |
| 33 | no-op | | 77 | no-op | | 121 | no-op | | | |
| 34 | 17 | | 78 | 39 | | 122 | 61 | | | |
| 35 | no-op | | 79 | no-op | | 123 | no-op | | | |
| 36 | 18 | | 80 | 40 | | 124 | 62 | | | |
| 37 | no-op | | 81 | no-op | | 125 | no-op | | | |
| 38 | 19 | | 82 | 41 | | 126 | 63 | | | |
| 39 | no-op | | 83 | no-op | | 127 | no-op | | | |
| 40 | 20 | | 84 | 42 | | 128 | 64 | | | |
| 41 | no-op | | 85 | no-op | | 129 | no-op | | | |
| 42 | 21 | | 86 | 43 | | 130 | 65 | | | |
| 43 | no-op | | 87 | no-op | | 131 | no-op | | | |

FIG. 8A

| Virtual Row | Array Row | Virtual Row | Array Row | Virtual Row | Array Row | Virtual Row | Array Row |
|---|---|---|---|---|---|---|---|
| 0 | 79 | 44 | 63 | 88 | 29 | 132 | 8 |
| 1 | no-op | 45 | no-op | 89 | no-op | 133 | no-op |
| 2 | 24 | 46 | 48 | 90 | 32 | 134 | 41 |
| 3 | no-op | 47 | no-op | 91 | no-op | 135 | no-op |
| 4 | 39 | 48 | 43 | 92 | 65 | 136 | 49 |
| 5 | no-op | 49 | no-op | 93 | no-op | 137 | no-op |
| 6 | 54 | 50 | 71 | 94 | 59 | 138 | 11 |
| 7 | no-op | 51 | no-op | 95 | no-op | 139 | no-op |
| 8 | 45 | 52 | 19 | 96 | 77 | 140 | 46 |
| 9 | no-op | 53 | no-op | 97 | no-op | 141 | no-op |
| 10 | 14 | 54 | 51 | 98 | 52 | 142 | 30 |
| 11 | no-op | 55 | no-op | 99 | no-op | 143 | no-op |
| 12 | 44 | 56 | 15 | 100 | 0 | 144 | 20 |
| 13 | no-op | 57 | no-op | 101 | no-op | 145 | no-op |
| 14 | 60 | 58 | 64 | 102 | 53 | 146 | 22 |
| 15 | no-op | 59 | no-op | 103 | no-op | 147 | no-op |
| 16 | 21 | 60 | 1 | 104 | 37 | 148 | 2 |
| 17 | no-op | 61 | no-op | 105 | no-op | 149 | no-op |
| 18 | 73 | 62 | 76 | 106 | 13 | 150 | 4 |
| 19 | no-op | 63 | no-op | 107 | no-op | 151 | no-op |
| 20 | 7 | 64 | 56 | 108 | 58 | 152 | 23 |
| 21 | no-op | 65 | no-op | 109 | no-op | 153 | no-op |
| 22 | 34 | 66 | 61 | 110 | 42 | 154 | 12 |
| 23 | no-op | 67 | no-op | 111 | no-op | 155 | no-op |
| 24 | 74 | 68 | 25 | 112 | 10 | 156 | 6 |
| 25 | no-op | 69 | no-op | 113 | no-op | 157 | no-op |
| 26 | 47 | 70 | 75 | 114 | 16 | 158 | 50 |
| 27 | no-op | 71 | no-op | 115 | no-op | 159 | no-op |
| 28 | 35 | 72 | 72 | 116 | 33 | 160 | 17 |
| 29 | no-op | 73 | no-op | 117 | no-op | 161 | no-op |
| 30 | 62 | 74 | 67 | 118 | 3 | 162 | 70 |
| 31 | no-op | 75 | no-op | 119 | no-op | 163 | no-op |
| 32 | 5 | 76 | 80 | 120 | 31 | 164-180 | no-op |
| 33 | no-op | 77 | no-op | 121 | no-op | | |
| 34 | 27 | 78 | 57 | 122 | 68 | | |
| 35 | no-op | 79 | no-op | 123 | no-op | | |
| 36 | 38 | 80 | 81 | 124 | 9 | | |
| 37 | no-op | 81 | no-op | 125 | no-op | | |
| 38 | 40 | 82 | 18 | 126 | 26 | | |
| 39 | no-op | 83 | no-op | 127 | no-op | | |
| 40 | 78 | 84 | 66 | 128 | 55 | | |
| 41 | no-op | 85 | no-op | 129 | no-op | | |
| 42 | 28 | 86 | 36 | 130 | 69 | | |
| 43 | no-op | 87 | no-op | 131 | no-op | | |

FIG. 8B

| Virtual Row | Array Row | | | Virtual Row | Array Row | | | Virtual Row | Array Row | |
|---|---|---|---|---|---|---|---|---|---|---|
| | Even | Odd | | | Even | Odd | | | Even | Odd |
| 0 | 0 | 1 | | 23 | no-op | no-op | | 46 | 62 | 63 |
| 1 | 2 | 3 | | 24 | 32 | 33 | | 47 | no-op | no-op |
| 2 | no-op | no-op | | 25 | 34 | 35 | | 48 | 64 | 65 |
| 3 | 4 | 5 | | 26 | no-op | no-op | | 49 | 66 | 67 |
| 4 | 6 | 7 | | 27 | 36 | 37 | | 50 | no-op | no-op |
| 5 | no-op | no-op | | 28 | 38 | 39 | | 51 | 68 | 69 |
| 6 | 8 | 9 | | 29 | no-op | no-op | | 52 | 70 | 71 |
| 7 | 10 | 11 | | 30 | 40 | 41 | | 53 | no-op | no-op |
| 8 | no-op | no-op | | 31 | 42 | 43 | | 54 | 72 | 73 |
| 9 | 12 | 13 | | 32 | no-op | no-op | | 55 | 74 | 75 |
| 10 | 14 | 15 | | 33 | 44 | 45 | | 56 | no-op | no-op |
| 11 | no-op | no-op | | 34 | 46 | 47 | | 57 | 76 | 77 |
| 12 | 16 | 17 | | 35 | no-op | no-op | | 58 | 78 | 79 |
| 13 | 18 | 19 | | 36 | 48 | 49 | | 59 | no-op | no-op |
| 14 | no-op | no-op | | 37 | 50 | 51 | | 60 | 80 | 81 |
| 15 | 20 | 21 | | 38 | no-op | no-op | | 61 | no-op | no-op |
| 16 | 22 | 23 | | 39 | 52 | 53 | | 62 | no-op | no-op |
| 17 | no-op | no-op | | 40 | 54 | 55 | | 63 | no-op | no-op |
| 18 | 24 | 25 | | 41 | no-op | no-op | | | | |
| 19 | 26 | 27 | | 42 | 56 | 57 | | | | |
| 20 | no-op | no-op | | 43 | 58 | 59 | | | | |
| 21 | 28 | 29 | | 44 | no-op | no-op | | | | |
| 22 | 30 | 31 | | 45 | 60 | 61 | | | | |

FIG. 9A

| Virtual Row | Array Row | | | Virtual Row | Array Row | | | Virtual Row | Array Row | |
|---|---|---|---|---|---|---|---|---|---|---|
| | Even | Odd | | | Even | Odd | | | Even | Odd |
| 0 | 48 | 5 | | 23 | no-op | no-op | | 46 | 24 | 37 |
| 1 | 52 | 77 | | 24 | 68 | 23 | | 47 | no-op | no-op |
| 2 | no-op | no-op | | 25 | 76 | 1 | | 48 | 72 | 75 |
| 3 | 4 | 13 | | 26 | no-op | no-op | | 49 | 28 | 81 |
| 4 | 32 | 51 | | 27 | 18 | 53 | | 50 | no-op | no-op |
| 5 | no-op | no-op | | 28 | 8 | 65 | | 51 | 14 | 29 |
| 6 | 64 | 25 | | 29 | no-op | no-op | | 52 | 22 | 9 |
| 7 | 52 | 33 | | 30 | 42 | 39 | | 53 | no-op | no-op |
| 8 | no-op | no-op | | 31 | 70 | 49 | | 54 | 34 | 63 |
| 9 | 50 | 45 | | 32 | no-op | no-op | | 55 | 2 | 41 |
| 10 | 38 | 61 | | 33 | 54 | 19 | | 56 | no-op | no-op |
| 11 | no-op | no-op | | 34 | 40 | 71 | | 57 | 46 | 3 |
| 12 | 60 | 73 | | 35 | no-op | no-op | | 58 | 20 | 47 |
| 13 | 44 | 21 | | 36 | 80 | 59 | | 59 | no-op | no-op |
| 14 | no-op | no-op | | 37 | 56 | 11 | | 60 | 58 | 81 |
| 15 | 74 | 27 | | 38 | no-op | no-op | | 61 | no-op | no-op |
| 16 | 26 | 7 | | 39 | 66 | 69 | | 62 | no-op | no-op |
| 17 | no-op | no-op | | 40 | 6 | 35 | | 63 | no-op | no-op |
| 18 | 16 | 43 | | 41 | no-op | no-op | | | | |
| 19 | 36 | 67 | | 42 | 0 | 17 | | | | |
| 20 | no-op | no-op | | 43 | 10 | 42 | | | | |
| 21 | 12 | 15 | | 44 | no-op | no-op | | | | |
| 22 | 78 | 57 | | 45 | 30 | 79 | | | | |

FIG. 9B

| Bit Plane Table x 1 Yielding 1024 bits | | | | Bit Plane Table x 4 Yielding 1024 bits | | | |
|---|---|---|---|---|---|---|---|
| Index | Weight (x1) | Label | | Index | Weight (x1) | Weight (x4) | Label |
| 0 | 1 | test | | 0 | 1 | 0, 1, 2, 3 | test |
| 1 | 1 | lsb0 | | 1 | n/a | n/a | None |
| 2 | 2 | lsb1 | | 2 | n/a | n/a | None |
| 3 | 4 | lsb2 | | 3 | 1 | 4 | lsb2 |
| 4 | 8 | lsb3 | | 4 | 2 | 8 | lsb3 |
| 5 | 16 | lsb4 | | 5 | 4 | 16 | lsb4 |
| 6 | 32 | lsb5 | | 6 | 8 | 32 | lsb5 |
| 7 | 64 | thm0 | | 7 | 16 | 64 | thm0 |
| 8 | 128 | thm1 | | 8 | 32 | 128 | thm1 |
| 9 | 128 | thm2 | | 9 | 32 | 128 | thm2 |
| 10 | 128 | thm3 | | 10 | 32 | 128 | thm3 |
| 11 | 128 | thm4 | | 11 | 32 | 128 | thm4 |
| 12 | 128 | thm5 | | 12 | 32 | 128 | thm5 |
| 13 | 128 | thm6 | | 13 | 32 | 128 | thm6 |
| 14 | 128 | thm6 | | 14 | 32 | 128 | thm6 |

FIG. 10

SYSTEM AND METHOD FOR MODULATING AN ARRAY OF EMISSIVE ELEMENTS

CROSS REFERENCE TO RELATED APPLICATIONS

This application is a continuation of, and claims priority to, U.S. patent application Ser. No. 17/178,576, filed on Feb. 18, 2021, entitled "SYSTEM AND METHOD FOR MODULATING AN ARRAY OF EMISSIVE ELEMENTS," which claims priority to U.S. Provisional Patent Application No. 62/977,897, filed on Feb. 18, 2020, the disclosures of which are incorporated by reference herein in their entireties.

FIELD OF THE INVENTION

The present invention relates to the design of a backplane useful to drive an array of pixels comprising emissive elements at each pixel and to an emissive array fabricated with such a backplane. More particularly, the present invention relates to a backplane designed such that it can modulate an array of emissive pixel elements in a manner that mitigates visual flashing and other human vision related artifacts that may be distracting to a human observer.

BACKGROUND OF THE INVENTION

Emissive displays have proved useful for a variety of applications. For example, plasma display panels (PDPs) were at one time the leading flat panel display technology. More recently, applications that are not display oriented have been postulated, including use as a pixilated emissive device in an additive manufacturing device and use as a component within a vehicular illumination system, such as a headlamp, for automotive applications.

Most recently, emissive display system developers have demonstrated emissive displays based on backplanes driving small LEDs with a pitch between adjacent pixels of 17 micrometers (hereafter microns or μm) or less. For applications requiring higher brightness and fewer individual light sources the small LEDs may be made larger although still small—on the order of 40 to 50 microns. The sizes stated are not limiting on this specification. These small LEDs are commonly termed microLEDs or μLEDs. LEDs take advantage of the band gap characteristic of semiconductors in which use of a suitable voltage to drive the LED will cause electrons within the LED to combine with electron holes, resulting in the release of energy in the form of photons, a feature referred to as electroluminescence. Those of skill in the art will recognize that semiconductors suitable for LED components may include trace amounts of dopant material to facilitate the formation of electron holes. Organic light emitting diodes or OLEDs are another example of a class of emissive devices.

The choice of semiconductor materials to form an LED will vary by application. In some applications for visual displays one monochrome color may be desirable, resulting in the use of a single semiconductor material for the LEDs of all pixels. Some LEDs provide white light by using blue light to illuminate a phosphor material or quantum dot material suitable to provide green and red light, which, when combined with the blue light, is perceived as white in color. In other applications, a full range of colors may be required, which will result in a requirement for three or more semiconductor materials configured to radiate, for example, red, green and blue or combinations thereof. An illumination system based on LEDs may be applied to use in a variety of applications, including motor vehicle lights. The present application deals mainly with illumination applications for moving vehicles.

Human vision exhibits a variety of behaviors under various conditions that needs to be taken into account when designing an array of emissive pixels to provide illumination, such as a headlamp system. A dominant characteristic of human vision is the perception of flicker. The circumstances between illumination from a headlamp and a human observing the illumination are fundamentally uncontrollable. The human observer may be the driver of the vehicle with headlamp affixed thereto or may be in another vehicle.

Flicker also depends on the part of the retina of the human eye on which the illumination falls. Differences between flicker in the central vision (photopic flicker) and flicker in the peripheral vision (scotopic flicker) are well known in the art. Other differences arise from differences of age or sex, and often simply from the random nature of all human sensory perceptions across a broad sample of people.

Flicker is often thought of through the absence of perceived flicker, which occurs at or above the flicker fusion frequency. Flicker fusion frequency is commonly defined as the frequency at or above which an intermittent light source is perceived as a steady light source by an average human observer. The flicker fusion frequency is referred to by various other names, such a flicker fusion threshold, each of which clearly refers to the same aspect of human vision. Applicant refers interested parties to the Wikipedia article *Flicker Fusion Threshold* for further information.

Another feature of human vision is a reaction to spatial frequencies in the illumination beam. The illumination beam is formed by a rectilinear array of emissive devices that can, under circumstances, form a beam shaped as a grating similar to a Ronchi grating used for various applications in optics. The contrast between the dark and bright stripes of such a beam would be naturally higher at night.

Another artifact commonly seen in pulse width modulated display devices is called dynamic false contours. Dynamic false contours arise when an image or gray scale ramp moves across a display in a direction that, in the case of the ramp, aligns with the ramp. The perception is that in areas of nearly identical gray scale values, the time difference between the two gray scale areas appears to develop a line between the two areas. This arises out of human vision because human vision does not operate according to the time frame intervals specified for pulse width modulation and may integrate across multiple time intervals.

The use of optical homogenization may mitigate all of these effects to a degree, but there is no certitude that individual headlamp designs will homogenize the entire beam. Therefore, it is important to assume that the output will not be homogenized when projected.

Because of the unpredictable nature of the interaction between the illumination beam and a human observer for the reasons cited, it is a goal of the present invention to obviate unfavorable interactions by eliminating as many causes of the formation of the preceding vision artifacts as possible through careful selection of modulation patterns for the array of emissive pixels. All potential variations are included within the scope of the present invention.

SUMMARY OF THE PRESENT INVENTION

The present invention pertains to a backplane comprising pixel drive circuits operative to deliver a modulated current to a plurality of emissive elements mounted thereon. More particularly, it pertains to a backplane suitable for use as part of a headlamp illumination system that provides selection mechanisms that mitigate the effects of pulse width modulation induced flashing that would otherwise affect human vision.

BRIEF DESCRIPTION OF THE DRAWINGS

FIG. 3 presents a pattern of write pointers positioned as a function of row and time.

FIG. 4A presents a pattern of write pointers where two adjacent columns of an array of emissive elements are modulated by different sets of write pointers.

FIGS. 4B-4C present a pattern of write pointers wherein four adjacent columns are each modulated by different sets of write pointers.

FIGS. 5A-5D present a row by row modulation implementation as a function of time across two adjacent columns wherein the first adjacent columns is modulated by a first set of write pointers and the second adjacent column is modulated by a second set of write pointers.

FIGS. 6A-6B depict the first 12 time intervals of a 13 write pointer modulation sequence wherein a single time interval representing a least significant bit is formed in conjunction with pairs of time intervals representing each higher order bit.

FIGS. 6C-6D depict one time interval of a 13 write pointer modulation sequence implemented across 13 separate time units.

FIGS. 7A-7B depict two implementations of a linear row mapping scheme that links a larger number of virtual rows to a lesser number of actual rows and to a number of no-op actions.

FIG. 8A depicts a linear mapping scheme similar to that of FIGS. 7A and 7B.

FIG. 8B depicts a mapping scheme in which the mapping is nonlinear and random.

FIG. 9A depicts a mapping scheme similar to that of FIGS. 7A and 7B in which each virtual row is linearly mapped to one even numbered row and one odd numbered row.

FIG. 9B depicts a mapping scheme similar to that of FIG. 8B in which each virtual row is mapped nonlinearly and randomly mapped to one even numbered row and one odd numbered row.

FIG. 10 presents a comparison of two bit plane tables each comprising a single test bit and a plurality of bit planes for the first table differing from the number of bit planes for the second table.

DETAILED DESCRIPTION OF THE INVENTION

One aspect of the present invention is the use of one or more addressing means simultaneously that randomize to a degree the on and off states of adjacent pixels in an array of emissive pixel elements. The use of addressing means rather than the manipulation of on and off states of individual emitters offers advantages of simplicity. One goal of simplifications to permit the controller of the array of emissive pixels to be integrated directly into the backplane driving the array of emissive pixels without excessive computational overhead.

Figure 1A:
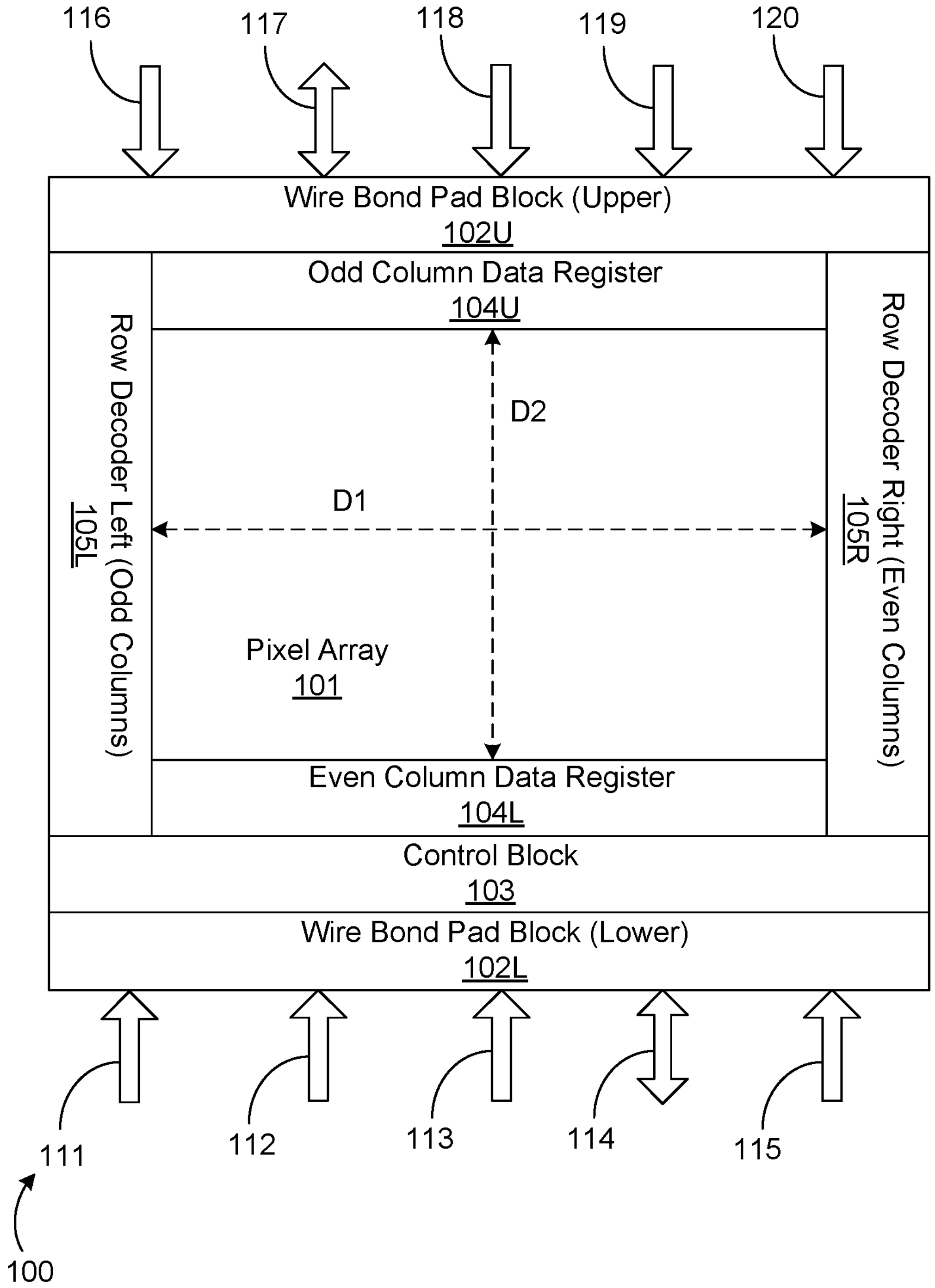
FIG. 1A presents a block diagram of a backplane suitable to drive an array of emissive elements.

FIG. 1A presents a diagram of the data transfer sections and selected external interfaces of spatial light modulator (SLM) 100. SLM 100 comprises pixel drive circuit array 101 operative to drive an array of emissive elements, left row decoder 105L for odd numbered columns, right row decoder 105R for even numbered columns, column data register array 104L for even numbered columns, column data register array 104*u* for odd numbered columns, control block 103, and wire bond pad blocks 102L (lower) and 102*u* (upper.) The individual pixel drive circuits of pixel drive circuit array 101 may be any type of pixel drive circuit compatible with pulse width modulation. A pulse-width modulated current at a fixed voltage is preferred for driving LEDs to avoid color shifting. Wire bond pad block 102L is configured so as to enable contact with an FPGA or other suitable connecting means so as to receive data and control signals over lines from an SLM controller such as that of FIG. 1B. The data and control signal lines for lower wire bond pad block 102L comprise clock signal line 111, op code signal lines 112, serial input-output signal lines 113, bidirectional temperature signal lines 114, and parallel data signal lines 115. The selected interfaces for upper wire bond pad block 102U comprise circuit voltages V_H 116, emissive pixel current mirror selection signal pads 117 and 118, rail voltages VDDAR and $V_{SS}$ pad 119 and common cathode return (V_Low) 120. The total number of wire bond pads may easily exceed 100 separate pads and may reach several hundred pads.

Wire bond pad block 102L receives emissive pixel state data and control signals and moves these signals to control block 103. Control block 103 receives the emissive pixel state data and routes the data to lower column data register array 104L for even columns and to upper column data register 104U for odd columns. In one embodiment an odd column data register and an even column data register are positioned on the same side of a pixel drive circuit array. Row address information is routed to odd row decoder left 105L, operative to select a row comprising pixel drive elements for odd numbered columns, and to even row decoder right 105R, operative to select a row comprising pixel drive elements for even numbered columns.

The use of the term row decoder is not used uniformly in the art. In this instance it means a collection of circuits—one circuit for each row associated with the collection—that receives a signal from a row-select originating circuit at the periphery of the backplane that designates which row is to actively receive data from the column drivers on the columns that are a part of that bank as defined herein. The circuit associated with the selected row releases a signal through a word line driver that pulls the word line high so that the memory cells controlled by the word line receive the data loaded on the column registers associated with the column on which the memory element is found. The exact form the circuits may take varies for a number of reasons, but all are considered to be encompassed within the scope of the word row decoder in this application.

Horizontal divisions are envisioned. A mixture of horizontal and vertical divisions is envisioned. In one example, pixel array 101 is divided horizontally near its midpoint top to bottom, as shown by line D1, and is divided vertically near its midpoint side to side, as shown by line D3. Row drivers are configured appropriately.

In one embodiment, the value of Op Code line 112 determines whether data received on parallel data signal lines 115 is address information indicating the row to which data is to be loaded or data to be loaded to a row. In one embodiment the row address information acts as header, appearing first in a time ordered sequence, to be followed by data for that row. In the context of the present application, the word "address" is most often a noun used to convey the location of the row to be written. The location may be conveyed as an offset from the location (address) of a baseline row or it may be an absolute location of the row to be written. This is similar to the manner in which a Random-Access Memory device, such as an SRAM, is written or read. The use of column addressing, also used in Random-Access Memory devices, may be envisioned, but other mechanisms, such as a shift register, are also envisioned. Use of a shift register to enable the writing of data to rows of the array is also envisioned.

In one embodiment, a separate test code may be asserted as an Op Code on a second line 112 which places the backplane in a test mode that may test the row identified over data signal lines 115. The duration of the test code is normally the duration of a least significant bit (lsb), although other durations are feasible.

In the case where multiple row decoders operate separately from one another, using modulation sequences that differ to varying degrees, an additional Op Code signal to initiate a test mode for each separate row decoder circuit may be required. In some cases, the different row decoders may each control segments of the same set of rows.

Row decoder left 105L for odd numbered columns is configured to pull the word line high for pixel drive circuits positioned in odd numbered columns of the decoded row, and row decoder right 105R is configured to pull the word line high for pixel drive circuits positioned in even numbered columns of the decoded row. In the case of row decoder left 105L, pulling the word line high for a row will cause data stored in column register array 104U to be transferred to memory circuits (not shown) in the pixel drive circuits found in the odd numbered columns of that row. In the case of row decoder 105R, pulling the word line high for a row will cause data stored in column register array 104L to be transferred to memory circuits (not shown) in the pixel drive circuits found in the even numbered columns of the decoded row. The row to be decoded by row decoder 105L is completely independent of the row to be decoded by row decoder 105R.

This permits data loaded on the column registers to be loaded onto a first row selected by row decoder 105L for odd numbered columns and a second row selected by row decoder 105R for even numbered columns. The rows selected by row decoder 105L and by row decoder 105R are not constrained in implementation and may be randomly selected or selected to implement a specific modulation scheme based on different starting points on the display. One may be random and the other not random. The implemented modulation sequences may differ from each other as well.

The depiction of left and right side row decoder circuits and upper and lower wire bond pad circuits is purely for ease of reference and is not limiting upon the present invention. The depiction of separate column data register for even columns and odd columns is for ease of reference and is not limiting upon the present invention.

Figure 1B:
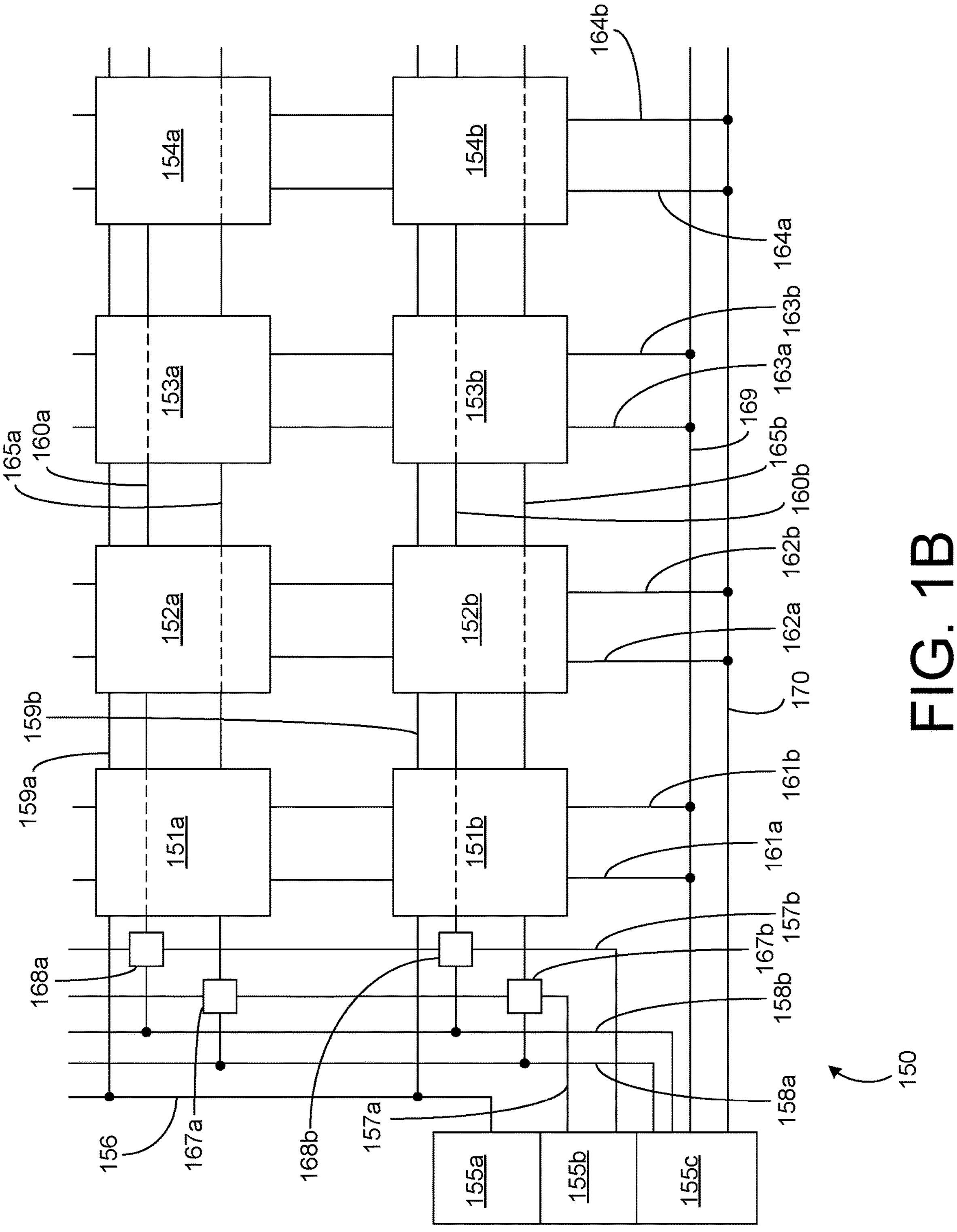
FIG. 1B presents a block diagram of a controller and backplane suitable to drive an array of emissive elements.

FIG. 1B depicts a simplified diagram 150 of display controller interfaces with an array of pixel circuits wherein the pixels of any row in odd number columns are modulated independently of the pixels of that row in even number columns. A display controller comprises static voltage section 155*a*, signal voltage control section 155*b* and data memory and logic control section 155*c*. A first row of pixel circuits comprises pixel drive circuits 151*a*, 152*a*, 153*a* and 154*a*, wherein pixel drive circuits 151*a* and 153*a* are placed in an odd numbered column and pixel drive circuits 152*a* and 154*a* are placed in an even numbered column. A second row of pixel circuits comprises pixel drive circuits 151*b*, 152*b*, 153*b* and 154*b* wherein pixel drive circuits 151*b* and 153*b* are placed in an odd numbered column and pixel drive circuits 152*b* and 154*b* are placed in an even numbered column. A first odd numbered column of pixel drive circuits comprises pixel drive circuits 151*a* and 151*b*. A first even numbered column of pixel drive circuits comprises pixel drive circuits 152*a* and 152*b*. A second odd numbered column of pixel drive circuits comprises pixel drive circuits 153*a* and 153*b*. A second even numbered column of pixel drive circuits comprises pixel drive circuits 154*a* and 154*b*. The choice of the number of pixel circuits and rows and columns in FIG. 1B is for ease of reference and is not limiting upon this disclosure. Arrays of pixel circuits comprising in excess of 1000 rows and 1000 columns are commonplace in products for both display purposes and non-display purposes.

Static voltage section 155*a* provides a set of static voltages required to operate the array of pixel drive circuits, the voltages comprising $V_{DDAR}$, $V_{SS}$, upper drive voltage V_H and cathode return voltage V_L loaded onto static voltage distribution bus 156.

Static voltage distribution bus 156 distributes $V_{DDAR}$, V_H, $V_{SS}$ and V_L to the pixel drive circuits of a first row over conductor 159*a* and to the pixel drive circuits of a second row over conductor 159*b*, wherein each of conductors 159*a* and 159*b* comprises at least one separate conductor for each supplied static voltage. In some designs, a static voltage conductor may be shared by two or more rows.

Signal voltage control section 155*b* delivers control signals required to operate the array of pixel drive circuits, such as word line (WLINE) high for the selected row, over bus 157*a* for odd numbered columns and over bus 157*b* for even numbered columns. Signal voltage control section 155*b* delivers signals to signal voltage distribution bus 157*a*, which in turn delivers the signals to the pixel drive circuits in odd numbered columns of a first row over WLINE 160*a* and to the pixel drive circuits in odd numbered columns of a second row over WLINE 160*b*. Signal voltage control section 155*b* delivers signals to signal voltage distribution bus 157*b*, which in turn delivers the signals to the pixel drive circuits in even number columns of a first row over WLINE 165*a* and to the pixel drive circuits in even number columns of a second row over WLINE 165*b*. Signal voltage distribution bus 157*a* and 157*b* each may comprise a plurality of conductors such that each control signal is delivered independently of other control signals. The row on which WLINE is to be held high is selected by row decoder circuits 167*a* and 167*b* for pixel drive circuits on odd numbered columns and 168*a* and 168*b* for pixel drive circuits on even numbered columns.

In one embodiment, voltage distribution busses 157*a* and 157*b* also distribute a global or semiglobal signal to each pixel drive circuit to control a non-data modulation FET (not shown) operative to act as a dimming control unit independent of the data state of the SRAM memory cell located within each pixel drive circuit.

Data memory and logic control section 155*c* performs several functions. It may, for example, process modulation data received in a standard 8-bit or 12-bit format into a form usable to pulse-width modulate a display. A first function is to determine a row for data to be written to and a second function is to load the data to be written onto that row. Data memory and logic control section 155*c* loads image data onto the column drivers (not shown) for each odd numbered column over bus 169 and for each even numbered column over bus 170. Conductors 161*a* and 161*b* represent a first pair of complementary bit lines for odd numbered columns and conductor 163*a* and 163*b* represent a second pair of complementary bit lines for odd numbered columns. Conductors 162*a* and 162*b* represent a first pair of complementary bit lines for even numbered columns and conductors 164*a* and 164*b* represent a second pair of complementary bit lines for odd numbered columns. Each of said pair of complementary bit lines are operative to transfer data from the column drivers (not shown) to the memory cell of each pixel driver circuit in either and even column or an odd column of the selected row, as appropriate. Data memory and logic control section 155*c* loads the selected address information for odd numbered columns onto address data bus 158*a*, which acts to select the correct row decoder circuit among row decoder circuits 167*a* and 167*b* both positioned on address data bus 158*a*. Data memory and logic control sections 155*c* loads the selected address information for even numbered columns onto address data bus 158*b* to select the correct row decoder circuit among row decoder circuits 168*a* and 168*b*, both positioned on address data bus 158*b*.

For clarity in this application, the term bank or bank of columns is used to describe an organized set of columns such the column formed by pixel drive circuits 151*a* and 151*b* and the column formed by pixel drive circuits 153*a* and 153*b*. The organizing point is that pixel drive circuit 151*a* and pixel drive circuit 153*a* both are operated by WLINE 160*a* and pixel drive circuit 151*b* and pixel drive circuit 153*b* are both operated by WLINE 160*b*. Pixel drive circuits on the same row in different columns that are operated by the same word line (WLINE) are in the same bank.

For a second point of clarity in this application, the term group refers to a contiguous block of columns that together form a pattern that is repeated across at least a division of the display if the array of emissive elements is divided into a plurality of divisions as previously explained. In the present example, the column formed by pixel drive circuits 151*a* and 151*b* together with the column formed by pixel drive circuits 152*a* and 152*b* form a pattern of two columns wherein the first member (pixel drive circuits 151*a* and 151*b*) are operated by WLINE 160*a* and WLINE 160*b* respectively and the second member (pixel drive circuits 152*a* and 152*b*) are operated by WLINE 165*a* and WLINE 165*b* respectively. This pattern is repeated across the group.

Figure 2A:
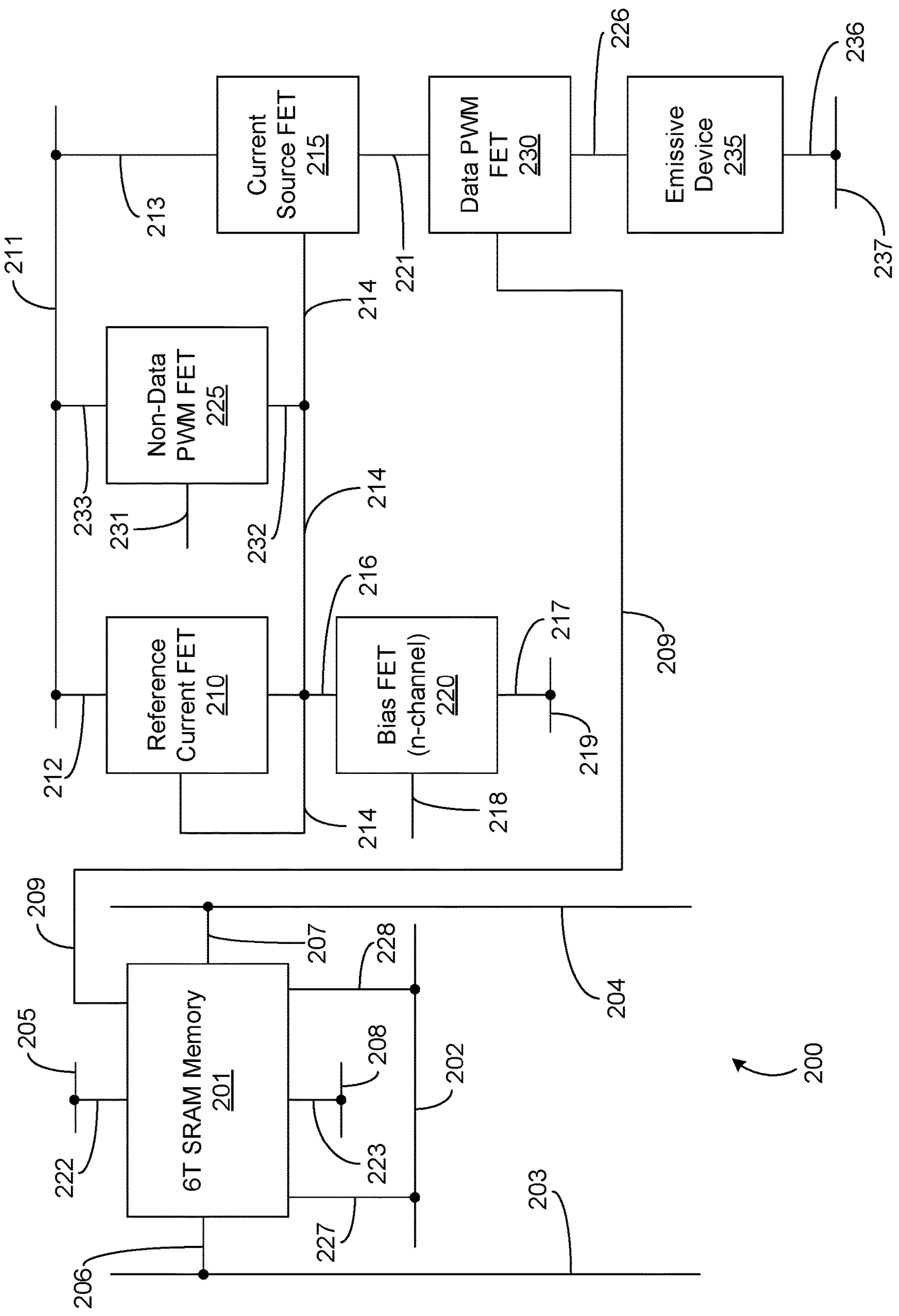
FIG. 2A presents a block diagram of an emissive pixel driver element that provides alternative current mirror selection options.
Figure 2B:
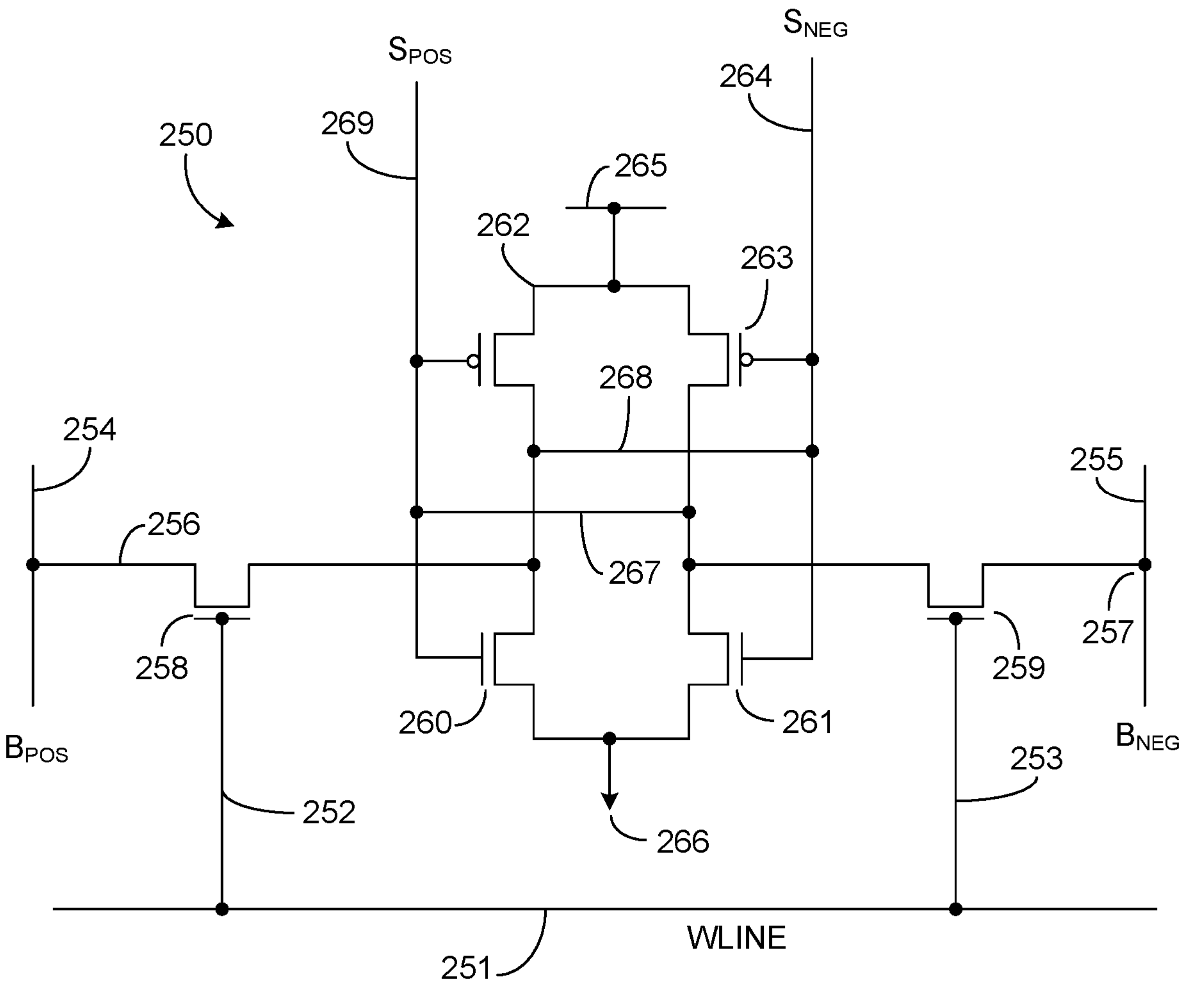
FIG. 2B presents a schematic circuit diagram of a 6-transistor SRAM cell configured to act as a component of an emissive pixel driver element.
Figure 2C:
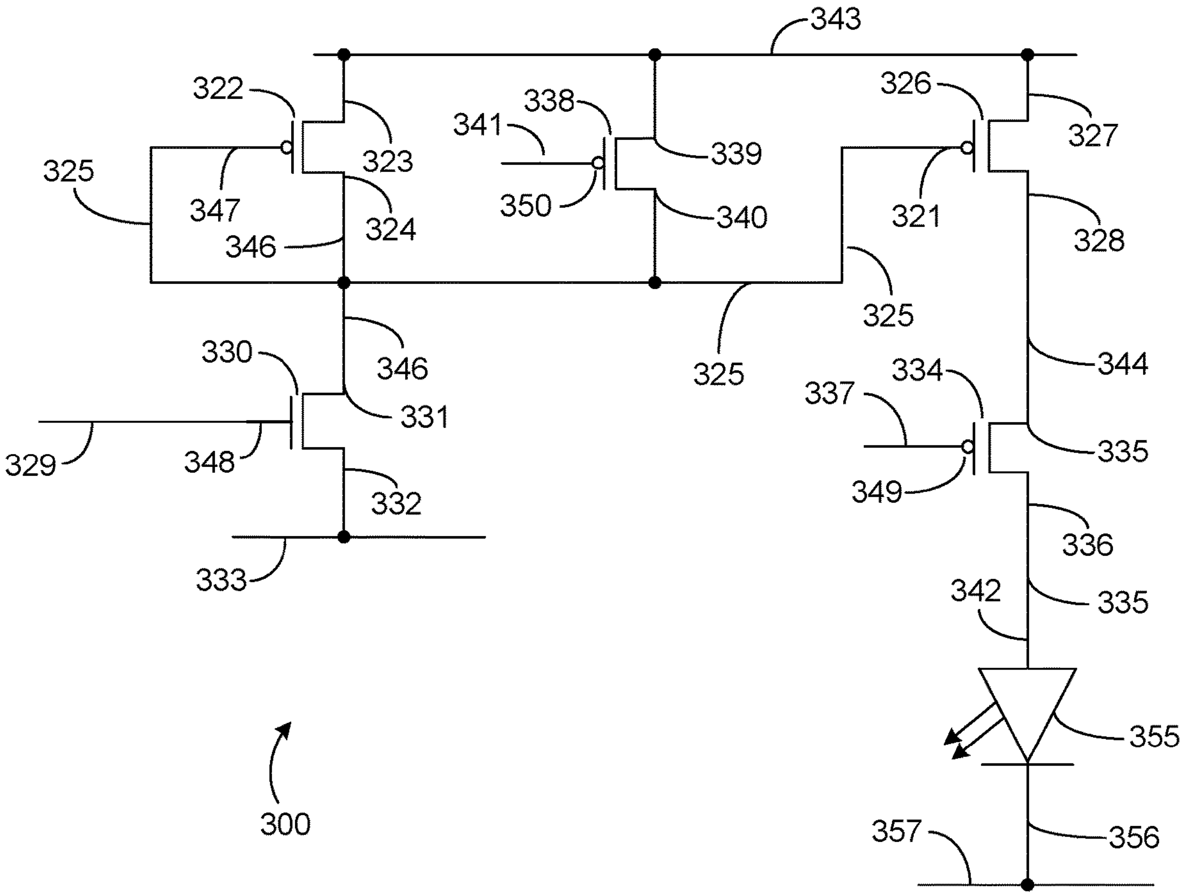
FIG. 2C presents a schematic circuit diagram of an emissive pixel driver element based on a current mirror circuit.

FIGS. 2A-2C present a pixel drive circuit suitable to act as a single drive circuit of an array of pixel drive circuits as previously discussed with respect to item 101 of FIG. 1A. Other pixel drive elements are known in the art and are equally suitable to form a pixel drive element of the present invention. The circuit disclosed in FIGS. 2A-2C of the present application is also disclosed in pending U.S. patent application Ser. No. 16/679,861, Backplane Adaptable to Drive Emissive Pixel Elements of Differing Pitches, FIGS. 2A-2C, filed 2019 Nov. 11

FIG. 2A presents block diagram 200 of a current mirror pixel circuit of an array of pixels after the present application. Pixel circuit 200 comprises SRAM memory cell 201, a current mirror source comprising FET transistors 210, 215, and 220, non-data modulation FET 225 operative to shut current source FET 215 off when pulled high and a data modulation section comprising data modulation FET 230 operative to pulse-width modulate the output of the drain of data modulation FET 230 responsive to the data state of SRAM memory cell 201 in order to impose gray scale on the output of emissive device 235 associated with that pixel current mirror drive circuit. SRAM memory cell 201 is depicted as a 6-T (6 transistor) cell although the use of other SRAM memory cells with different numbers of transistors is anticipated.

SRAM memory cell 201 is connected to word line (WLINE) 202 by conductors 227 and 228. Complementary data lines ($B_{POS}$) 203 and ($B_{NEG}$) 202 connect to SRAM memory cell 201 by conductors 206 and 207 respectively. When WLINE 202 is pulled high, pass transistors in the memory cell allow new data to be stored in the memory cell. Data output $S_{NEG}$ of SRAM 201 is asserted over conductor 209 onto the gate of data modulation FET 230, also referred to as a data modulation element. Other configurations of a data modulation element are known. For example, if the dimming function of non-data modulation FET 225 is not required, then it could be repurposed as a data modulation FET and data modulation FET 230 could be eliminated. Operation of the 6T SRAM memory is explained in detail in FIG. 2B and its associated text.

FETs 210, 215, 220, 225, and 230 form a circuit operative to deliver a pulse-width modulated current waveform to emissive device 235 driven by the pulse width modulated waveform at required voltage and current levels. Reference current FET 210 and bias FET 220 form a reference current circuit operative to provide a reference current to the gate of current source FET 215 at a required voltage. Reference current FET 210 sets the reference current $I_{REF}$ and bias FET 220 sets the voltage for the reference current on conductors 214 and 216. Bias FET 220 is a large L FET designed to operate as a variable resister based on a bias voltage $V_{BIAS}$ applied to its gate over conductor 218. In one embodiment, $V_{BIAS}$ is set externally and, in one embodiment, is supplied to all pixel circuits. In one embodiment the gate of bias FET 220 is connected to $V_{SS}$. The source of bias FET 220 is connected to conductor 219 by conductor 217. Conductor 219 is connected to voltage $V_{SS}$. In one embodiment, the stable reference current asserted onto conductor 214 is supplied to a plurality of pixel drive circuits. In one embodiment, the stable reference current is asserted onto the gate of its own current source FET 215 and onto the gates of current source FETs forming part of a block of pixels.

Current source FET 215 is operative to receive a stable reference current at its gate over conductor 214 and mirror that current. The source of current source FET 215 is connected over conductor 213 to conductor 211, which supplies voltage V_H. The drain of current source FET 215 asserts a stable current over conductor 221, wherein the stable current may differ from the reference current. To achieve the desired current at the drain of FET current source 215, current source FET 215 must be designed to deliver that current. Current source FET 215 is preferably designed so that the relationship between the length (L) and the width (W) is selected in order to achieve the desired current at its drain. The desired current asserted on the drain of current source FET 215 may differ from the reference current received on the gate of current source FET 215, depending on the design W/L ratio of current source FET 215. Different W/L designs may be required for pixels of different colors.

FET 225 acts as a non-data modulation element on the output of current source FET 215. The gate of non-data modulation FET 225 receives a signal 1_off from an external modulation element. The source of non-data modulation FET 225 is connected to conductor 211 by conductor 233, which asserts V_H onto the source of non-data modulation FET 225. If 1_off is low then non-data modulation FET 225 asserts V_H minus a small threshold voltage onto its drain, whereupon the substantially V_H voltage acts upon the gate of current source FET 215 to take current source FET 215 out of saturation mode. This results in current source FET 215 no longer mirroring the current asserted on its gate, This enables signal 1_off to act as a form of non-data modulation control signal. The action of 1_off is to raise or lower the overall duty cycle of the modulation output of pixel circuit 100, thereby raising or lowering its perceived intensity without regard for the data state of the SRAM cell.

Data modulation FET 230 comprises a data modulation section suitable to respond to pulse-width modulation waveforms used to create gray scale modulation. The need to perform this function is well known in the art. The output of the drain of current source FET 215 is asserted onto the source of data modulation FET 230 over conductor 221. The gate of data modulation FET 230 is connected to output $S_{NEG}$ of SRAM 201 over conductor 209. When the data state of SRAM 201 is on, then $S_{NEG}$ is low and acts on the gate of data modulation FET 230 to enable it to assert the current asserted onto its source over conductor 221 onto its drain over conductor 226.

The output of the drain of data modulation FET 230 is asserted onto conductor 226. The output comprises a pulse width modulated signal operative to create a gray scale modulation at a desired intensity. The output is connected over conductor 226 to the anode of emissive device 235. The cathode of emissive device 235 is connected by terminal 236 to V_L asserted onto conductor 237. The voltage level of V_L is lower than V_H and may be lower than $V_{SS}$ and may be a negative voltage. Emissive device 235 may be an LED, μLED or OLED device or some other emissive device such as a laser diode.

In order to avoid aliasing caused by the operating rate of 1_off should create pulse intervals that is shorter than the shortest pulse duration imposed on S_neg by a substantial margin, perhaps a factor of 10 to 1 in order to avoid aliasing. In some non-display applications, the issue of aliasing may be less important. In that case the pulse interval of 1_off may correspond to tens or more of lsb internals. In one embodiment operation of 1_off is synchronized with operation of S_neg.

FIG. 2B shows a preferred embodiment of a storage element 250. Storage element 250 is preferably a CMOS static ram (SRAM) latch device. Such devices are well known in the art. See DeWitt U. Ong, Modern MOS Technology, Processes, Devices, & Design, 1984, Chapter 9 5, the details of which are hereby fully incorporated by reference into the present application. A static RAM is one in which the data is retained as long as power is applied, though no clocks are running. FIG. 1B shows the most common implementation of an SRAM cell in which six transistors are used. FET transistors 258, 259, 260, and 261 are n-channel transistors, while FET transistors 262, and 263 are p-channel transistors. In this particular design, word line WLINE 251, when held high, turns on pass transistors 258 and 259 by asserting the state of WLINE 251 onto the gate of pass transistor 258 over conductor 252 and onto the gate of pass transistor 259 over conductor 253, allowing ($B_{POS}$) 254, and ($B_{NEG}$) 255 lines to remain at a pre-charged high state or be discharged to a low state by the flip flop (i.e., transistors 262, 263, 260, and 261). The potential on $B_{NEG}$ 254 is asserted onto the source of pass transistor 258 over conductor 256, and the potential on $B_{NEG}$ 255 is asserted onto the source of pass transistor 259 over conductor 257. The drain of pass transistor 258 is asserted onto the drains of transistors 260 and 262 and onto the gates of transistors 261 and 263 over conductor 268 while the drain of pass transistor 259 is asserted onto the drains of transistors 261 and 263 and onto the gates of transistors 260 and 262 over conductor 267. Differential sensing of the state of the flip-flop is then possible. In writing data into the selected cell, ($B_{POS}$) 254 and ($B_{NEG}$) 255 are forced high or low by additional write circuitry on the periphery of the array of pixel circuits. The side that goes to a low value is the one most effective in causing the flip-flop to change state. In the present application, one output port 264 is required to relay to circuitry in the remainder of the pixel circuit whether the data state of the SRAM is in an "on" state or an "off" state. The signal output in this case is $S_{NEG}$, asserted onto conductor 264, meaning that when the data state of storage element 250 is high or on, the output of storage element 250 is low. As will be shown regarding FIG. 2C, $S_{NEG}$ is asserted onto the gate of a p-channel FET, causing it to conduct.

SRAM circuit 250 is connected to $V_{DDAR}$ by conductor 265 and to $V_{SS}$ by conductor 266. $V_{DDAR}$ denotes the $V_{DD}$ for the array. It is common practice to use lower voltage transistors for periphery circuits such as the I/O circuits and control logic of a backplane for a variety of reasons, including the reduction of EMI and the reduced circuit size that this makes possible.

The six-transistor SRAM cell is desired in CMOS type design and manufacturing since it involves the least amount of detailed circuit design and process knowledge and is the safest with respect to noise and other effects that may be hard to estimate before silicon is available. In addition, current processes are dense enough to allow large static RAM arrays. These types of storage elements are therefore desirable in the design and manufacture of liquid crystal on silicon display devices as described herein. However, other types of static RAM cells are contemplated by the present invention, such as a four transistor RAM cell using a NOR gate, as well as using dynamic RAM cells rather than static RAM cells.

The convention in looking at the outputs of an SRAM is to term the outputs as complementary signals $S_{POS}$ and $S_{NEG}$. The output of memory cell 250 connects the gate of transistors 263 and 261 over conductor 264 to circuitry (not shown) operative to receive the output of memory cell 250. By convention this side of the SRAM is normally referred as S_neg or $S_{NEG}$. The gates of transistors 262 and 260 are normally referred to as $S_{POS}$. Either side can be used provided circuitry, such as an inverter, is added where necessary to ensure the proper function of the transistor receiving the output data state of the memory cell.

FIG. 2C presents a schematic drawing of a current mirror circuit implementation 300 as presented in the block diagram of FIG. 2A. P-channel FET 322 and p-channel FET 326 together form a reference current/current source unit suitable to provide an unmodulated current to a modulating circuit at a voltage determined by the voltage applied to the gate of large L n-channel bias FET 330.

Source 323 of reference current FET 322 is connected to voltage V_H asserted on conductor 343, wherein V_H is an external global voltage that is separate from other external global voltages such as $V_{DDAR}$ and $V_{SS}$. Reference current FET 322 is operated in diode mode wherein gate 347 and drain 324 are connected by electrical conductor 325 and conductor 346. Gate 347 and drain 324 of reference current FET 322 are connected to gate 321 of current source FET 326 as described herein. Conductor 325 and conductor 346 are electrically connected to gate 321 of current source FET 326 over conductor 352. Reference current FET 322 sets the reference current for the current mirror circuit.

N-channel bias FET 330 is a large L FET that acts as a variable resistor when operated in saturation. Drain 331 of bias FET 330 is connected to gate 347 and drain 324 of reference current FET 322, all of which are connected to gate 321 of current source FET 326 as described previously. Source 332 of large L n-channel bias FET 330 is connected to $V_{SS}$ over conductor 333. Gate 348 of bias FET 330 is connected to bias voltage $V_{BIAS}$ over conductor 329. Pixel drive circuits with different color emissive elements may have different $V_{BIAS}$ requirements so a plurality of different $V_{BIAS}$ voltages applied over independent circuits is conceived for pixels of different colors.

Together reference current FET 322 and bias FET 330 deliver a stable reference current at a fixed voltage to gate 321 of current source FET 326. The fixed voltage is determined by voltage $V_{BIAS}$ asserted on gate 348 of bias FET 330.

Source 327 of current source 326 is connected to conductor 343 which supplies voltage V_H. This places source 323 of reference current FET 322 and source 327 of current source FET 326 at the same potential and electrically connected through conductor 343. Drain 328 of current source FET 326 delivers a required voltage and current. The voltage and current output of drain 328 of current source FET 326 is delivered to source 335 of data modulation FET 334 over conductor 344.

As is well known in the art, current source FET 326 may be designed to deliver a stable current over drain 328 that is greater or lower than the reference current delivered to gate 321 of current source FET 326. Because current mirror FETs 322 and 330 are unaffected by the data state of the associated memory device (not shown), in one embodiment the output of the reference current FET of one pixel may act as the reference current FET for a nearby pixel provided the voltage of the reference current is also compatible with the emissive element on the nearby pixel. Because of the aforementioned statement regarding current source FET 326, it is clear that different currents may be derived from a single reference current. The nearby pixel sharing a current mirror may therefore receive a different current and have an associated emissive element of a different color type provided a compatible voltage is delivered. A mechanism for creating different current outputs is a change to the W/L aspect ratio of current source FET 326.

The use of current source circuits other than a current mirror circuit is conceived of. One such circuit is disclosed in FIG. 1A of pending patent application U.S. Ser. No. 16/802,100, the contents whereof are incorporated herein by reference.

P-channel non-data modulation FET 338 is placed adjacent and electrically parallel to current source FET 326. When gate 350 of non-data modulation FET 338 is held low source 339 is connected to drain 340, effectively connecting V_H from conductor 343 onto conductor 352 minus a small threshold voltage. This places gate 321 of current source FET 326 at a voltage near voltage V_H on source 327, which takes current source FET 326 out of saturation and effectively shuts it off. This provides a modulation capability independent of the data state of the memory cell.

Non-data modulation FET 338 may be turned "on" or "off" by a number of different modulation requirements. In one embodiment, a relatively high frequency rectangular waveform of varying duty cycle may be used to lower the apparent intensity of an emissive element. In another embodiment, a waveform is imposed on non-data modulation FET 338 that serves to cause on state emissive elements to emit light for a time equivalent to a desired modulation duration. Other modulations are envisioned. Light is emitted by emissive element 355 only when data modulation FET 334 and non-data modulation FET 338 are both in an on state.

Data modulation FET 334 forms a data modulation section. Data modulation FET 334 is turned on or off in response to the data state stored in a memory cell such as memory cell 250 of FIG. 2B. Data modulation FET 334 turns on when on state data stored in a memory device such as memory cell 250 of FIG. 2B causes a low voltage to be applied to gate 349 of p-channel data modulation FET 334, thereby causing data modulation FET 334 to assert an output onto drain 336. The output (voltage and current) of data modulation FET 334 is asserted by drain 336 onto conductor 345 that connects to anode 342 of emissive element 355.

The output (voltage and current) of data modulation FET 334 onto drain 336 is connected to conductor 345. The output comprises pulse-width modulated current and voltage, suitable to be applied to anode 342 of emissive element 355. The cathode of emissive element 355 is connected to voltage supply V_L wherein V_L is lower than V_H and may be lower than $V_{SS}$ or may be a negative voltage. The level of V_L is selected so that the difference between the voltage asserted on the anode of emissive element 355 and the voltage asserted on the cathode of emissive element 355 is sufficient to cause emissive element 355 to discharge when circuit 300 is an on state.

FIG. 3 presents a set of write pointers that are configured to provide a pulse width modulation to an array of pixel circuits. The set of write pointers are based on concepts of operation of a pulse width modulation method disclosed in U.S. patent application Ser. No. 10/435,427, now U.S. Pat. No. 8,421,828 and its Continuation Applications, U.S. patent application Ser. No. 13/790,120, now U.S. Pat. No. 9,583,031 and U.S. patent application Ser. No. 15/408,869, now U.S. Pat. No. 9,824,619, the contents whereof are incorporated herein by reference. These patents are referred to collectively as the MegaMod patents.

A general overview of the modulation method, hereafter referred to as MegaMod, is that it relies on differing spacings between rows that receive data directed to those rows by write pointers to create differing modulation durations for those rows that are determined by the spacing between the rows.

As background, Applicant reviews the patented material of the referenced patents by example. In the example of FIG. 3, labels A1, A2, A3, and A4 form a write pointer sequence. A write pointer directs data to be written to a row of an array of pixel elements. The time units across the top indicate the temporal order in which the row write actions take place; that is, A1 is written first in time unit 1, followed by A2 in time unit 2, A2 is followed by A3 in time unit 3, and A3 is followed by A4 in time unit 4. The pattern of A1, A2, A3 and A4 is then repeated over time units 5, 6, 7 and 8, and afterwards again over time units 9, 10, 111 and 12 and over time units 13, 14, 15, 16. The time units are arbitrary units of time during which a row write action may take place. Each time unit is of substantially the same duration as all other time units. The application of a write pointer sequence takes place over a time interval comprising a plurality of time units. For example, time interval 3 comprises time units 9, 10, 11 and 12 during which write pointers A1, A2, A3 and A4 direct data to rows 3, 4, 6 and 10 respectively. Similar considerations apply to each of the other time intervals depicted in FIG. 3.

The direction and magnitude of motion for subsequent applications of the write pointer sequence formed by A1, A2, A3 and A4 is down the rows with an offset of one row from the row previously pointed to by the preceding instance of the write pointer sequence. For example, the first instance of A1 is found writing to row 1 during time unit 1, while the second instance of A1 is found writing to row 2 during time unit 5, and the third instance of A1 is found writing to row 3 during time unit 9, and the fourth instance of A1 is found writing to row 4 during time unit 13. Similar observations for time interval and row spacing can be made for write pointers A2, A3 and A4.

The creation of pulse width modulation occurs because a first write pointer directs data to a first row which receives data directed to it by a second write pointer that is different to the first write pointer. Because the second write pointer is located a number of rows away from the first write pointer at the time the row is written and all intervening rows must also be written in order by the second write pointer, the time that the row data is unchanged is proportional to the number of rows between the first write pointer and the second write pointer. As a first example, write pointer A2 directs data to row 2 during time unit 2. The next write pointer to direct data to row 2 is write pointer A1 during time unit 5. This effectively means that the interval during which the data on row 2 is presented is 3 time units in duration.

As a second example, write pointer A3 directs data to row 4 during time unit 3. The next write pointer to direct data to row 4 is write pointer A2 during time unit 10. This is equivalent to 7 time units.

Row 1 and row 2 are on adjacent rows while row 2 and row 4 have intervening row 3 to which nothing is written. The modulation duration for A2 and A1 is 3 time units while the modulation duration for A3 and A2 is 7 time units. The modulation duration for A4 and A3 is 15 time units. In a pure binary weighted sequence of the three lowest least significant bits, the relative weighting would be 1, 2 4. In this example using row spacings of 1 row displacement, 2 rows displacement and 4 rows displacement, the relative ratios become 1, 2⅓, 5. Stated differently they become 0.8, 1.86, 4 if the temporal weightings are based on the 4 row displacement being a binary weighting of 4 ($2^2$.)

The relationship between row spacing and pulse width duration can also be made more linear through the use of stall intervals (not shown) between temporally adjacent time intervals, wherein no data is written during stall intervals. Stall intervals may also be placed between individual write actions. This can be implemented through actions within control section 155*b* of FIG. 1B.

These numbers are sufficiently close to support building a pulse width modulation on this principle. Applicant has previously developed modulation sequences able to represent 2000 gray levels in liquid crystal devices using the basic techniques described here.

FIG. 4A presents the first two time intervals of the application of a pair of modulation sequences after the type that could be applied using the backplane circuitry disclosed in FIGS. 1A and 1B, wherein the pixel drive elements in odd numbered columns have a first modulation sequence applied to them and the pixel drive elements in even numbered columns have a second modulation sequence applied to them independent of the first modulation sequence. The independent row drivers and word lines described with respect to circuit 150 of FIG. 1B are required to implement this. The first time interval presents a first instance of the odd column modulation sequence comprising write pointers A1, A2, A3, A4 and A5 and a first instance of the even column modulation sequence comprising write pointers B1, B2, B3, B4 and B5. In this particular example, the modulation sequence for even columns is identical to the modulation sequence for odd columns but starts at a different point in the modulation sequence approximately halfway through the sequence. The temporal order for the example of FIG. 4A is top to bottom for both even and odd columns. For example, in the Odd Column, row 1 receives data directed to it by write pointer A1, after which row 2 receives data directed to it by write pointer A2. The remainder of the write pointers continue to direct data to rows in temporal order. In the Even Column, row 4 receives data directed to it by write pointer B5, after which row 13 receives data directed to it by write pointer B1. The remainder of the write pointer continue to direct data to rows in temporal order.

The even columns and odd columns may also be described as interleaved or interlaced. Interlaced is a term of art in cathode ray tube based displays, that signifies that the image being displayed is displayed in two parts, wherein the first part and the second part are both needed to have a complete image. The two images are offset so that the lines of the first image fall between the lines of the second image.

The write pointer pattern of Odd Columns beginning at row 1 in the first time interval is duplicated in Even Columns beginning at row 13. Because the height of the modulation sequence is approximately the same height as the rows of the display, the write pointer pattern will begin to wrap around to the top row of the array in subsequent time intervals once an individual write pointer has reached the last line of the array. The start points for write pointer A1 and write pointer B1 are approximately 180 degrees out of phase since the modulation height is substantially the same as the number of rows in the array.

In the second time interval each write pointer of the odd columns and of the even columns is displaced one row down the array. Write pointer A1 now directs data to row 2, write pointer A2 to row 3, write pointer A3 to row 5 and so forth. Write pointer B5 now directs data to row 5, write pointer B1 to row 14. Write pointer B3 to row 15 and so forth.

Write pointer A1 in the second time interval directs data to row 2 in odd columns, which previously received data in the first time interval directed to it by write pointer A2. In like manner, write pointer B1 directs data to row 14 in the second time interval which previously received data in the first time interval directed to it by write pointer B2. This established that the write pointer sequence A1-A5 operating on odd columns and the write pointer sequence B1-B5 operating on even columns provide pulse width modulation in the manner described for FIG. 3. Projecting the information of FIG. 4A onto further time intervals would result in similar performance.

The concept of interleaved columns can be expanded further. FIGS. 4B and 4C expand the modulation concept of FIG. 4A to encompass modulating an array wherein the array is modulated by four separate row addressing schemes each controlling the pixels of a single column of a contiguous group of four columns. A plurality of instances of the contiguous group of four columns is envisioned. The contiguous group of four columns may be truncated to fewer columns at the edges of the array. FIG. 4B depicts a first time interval and FIG. 4C depicts a second time interval of write pointer sequences A1-A5, B1-B5, C1-C5 and D1-D5 imposed on an array comprising 24 separately addressable rows. Each row of the array will require a separate row decoder for each column of the example presented here. All pixels found in a single row in odd column 1, for example, will be served by the same row decoder. The same situation applies to all pixels found in a single row in even column 2, odd column 3 and even column 4 respectively.

In this example, the write pointer sequences are all identically defined but have different start points within the sequence. Considering the first time interval found in FIG. 4B, the write pointer sequence A1-A5 in odd column 1 is presented in order. Write pointer sequence B1-B5 in even column 2 begins with write pointer 5 at row 1 followed by write pointer B1 at row 13, which makes is approximately 180 degrees out of phase with write pointer sequence A1-A5 on the 24 row array Write pointer sequence C1-C5 in odd column 3 begins with write pointer C1 at row 6, which is approximately halfway between write pointer A1 and write pointer B1, making it roughly 90 degrees out of phase with write pointer sequence A1-A5 and B1-B5. Write pointer sequence D1-D5 begins with write pointer D1 at row 19, which is approximately halfway between write pointer B1 and the end of the 24 row array, which makes it roughly 270 degrees out of phase with write pointer sequence A1-A5.

Reviewing the second time interval found in FIG. 4C, each of write pointer sequences A1-A5, B1-B5, C1-C5 and D1-D5 starts one row displaced from its position in FIG. 4B. Operating successive time intervals will create a pulse width modulation with a plurality of pulse durations where the pulse duration is determined by the spacing between adjacent rows as previously described.

FIGS. 5A-5D present a fuller description of a modulation sequence using the even odd convention disclosed in FIG. 4A when implemented on an array comprising 24 rows depicted across 20 time intervals. FIG. 5A presents time intervals 1-10 on rows 1 to 16 and FIG. 5C presents time intervals 11-20 of rows 1 to 16. FIG. 5B presented time intervals 1-10 on rows 17-24 and also presents the corresponding last row wraparound that occurs after row 24 is written, by showing rows 1-8 for the next time interval in line with the current time interval in order to emphasize the role of row spacing. FIG. 5D does the same for time intervals 11-20 on rows 17-24 with the same wraparound.

The write pointer sequence operates as previously described. Write pointer sequence A1-A5 and write pointer sequence B1-B5 maintain the same relative spacing while the sequence is successively applied by moving the sequence down the array by one row at each successive application in a new time interval. When a write pointer reaches the last row of the array, it advances to the first row of the array in which is the beginning of the time interval after the next time interval. For example, write pointer B4 directs data to row 24 during time interval 5 and then directs data to row 1 during time interval 7. The wrap around moves a write pointer from the last write pointer in a first time interval to the first write pointer in the time interval after the next immediate time interval (the second succeeding time interval).

FIG. 5A starts with write pointer A1 for odd columns on row 1 during the first time interval. The row write action for even columns occurs in time interval 1 occurs at row 4, where write pointer B5 directs data to the pixels situated in even columns on row 4. Write pointer sequence A1-A5 and write pointer sequence B1-B5 have the same row spacings with write pointer A1 at row 1 and write pointer B1 at row 13. This places write pointer sequence A1-A5 and write pointer sequence B1-B5 approximately 180 degrees out of phase with respect to position on the 24 row array. In the second time interval write pointer A1 is positioned at row 2 while write pointer B1 is positioned at row 14, which maintains the 180 degree phase relationship with respect to position on the 24 row array. As write pointer A1 and write pointer B1 move down the rows of the array, the same relationship is maintained until write pointer B1 wraps around to the top of the array at time slot 14. At time slot 14, write pointer B1 directs data to row 1 while the preceding instance of write pointer A1 in time slot 13 directs to row 13, which maintains the 180 degree phase relationship previously noted.

The spacing between rows is determined as shown in the following table. The column for write pointer start is the write pointer that establishes a modulation state and the column for write pointer end is the write pointer that ends that modulation state by initiating another modulation state. The later modulation state may be the same as the earlier modulation state or may be different. If the write pointers propagate up the array rather than down the array, then the start and end write pointers are reversed.

| Write Pointer Start | Write Pointer End | Rows Separation | Time Intervals |
|---|---|---|---|
| A2 | A1 | 1 | 1 |
| B2 | B1 | | |
| A3 | A2 | 2 | 2 |
| B3 | B2 | | |
| A4 | A3 | 4 | 4 |
| B4 | B3 | | |
| A5 | A4 | 8 | 8 |
| B5 | B4 | | |
| A1 | A5 | 10 | 10 |
| B1 | B5 | | |

The resulting time durations are not completely linear with respect to the row separations because the point in time within a time interval at which the second action occurs is not exactly at the same point in the time interval, as was previously discussed with regard to FIG. 3. The resulting time durations are monotonic and are easily converted through a lookup table into useful modulations.

In practice the results of this modulation method may be somewhat less linear than is obvious from the foregoing example. The number of time intervals cited does not account for the position each write pointer occupies within the time interval. The more write pointers there are in a modulation sequence the closer the time intervals for each row will be to an ideal time interval.

One issue that arises in developing a modulation is how to implement a modulation of a duration to create a least significant bit modulation in those instances where the available bandwidth for delivering modulation does not support that short a time interval. Defining based on the minimum duration LSB may result in visual artifacts due to unwanted increases in the duration of higher order bits.

FIGS. 6A and 6B present a solution applicable in some situations. The write pointer sequence comprises write pointer A1-A13. The following table presents information regarding how this sequence may work.

| Write Pointer Start | Write Pointer End | Rows Separation | Time Intervals | Instances | Total Time Intervals |
|---|---|---|---|---|---|
| A2 | A1 | 4 | 4 | 2 | 8 |
| A9 | A8 | | | | |
| A3 | A2 | 2 | 2 | 2 | 4 |
| A10 | A9 | | | | |
| A4 | A3 | 4 | 4 | 2 | 8 |
| A11 | A10 | | | | |
| A5 | A4 | 4 | 4 | 2 | 8 |
| A12 | A11 | | | | |
| A6 | A5 | 1 | 1 | 2 | 2 |
| A13 | A12 | | | | |
| A7 | A6 | 4 | 4 | 2 | 8 |
| A1 | A13 | | | | |
| A8 | A7 | 1 | 1 | 1 | 1 |

In this example, the upper bits are divided into two instances, each of approximately half the needed duration for the upper bits. To implement this, data segment A2-A1 of four time intervals duration is paired with data segment A9-A8 of four time interval duration, thereby creating a total of 8 time intervals duration. Pairing for this example means that the data presented on the two member of the pair are the same, i.e., if the first segment is high then the second segment is high. Data segment A3-A2 of two time intervals duration is paired with data segment A10-A9, also of two time intervals duration, creating a total of four time segments duration. Data segment A4-A3 is paired with data segment A11-A10, again for a cumulative modulation duration of 8 time intervals. Data segment A5-A4 and data segment A12-A11 are paired for a cumulative modulation duration of 8 time intervals. Data segment A6-A5 is paired with data segment A13-A12 for a cumulative modulation duration of 2 time intervals. Data segment A7-A6 of four time intervals duration is paired with data segment A1-A13 of 4 time intervals duration, for a total modulation duration of 8 time intervals. Data segment A9-A7 of one time interval duration is not paired with another data segment, and therefore has a modulation duration of one time interval.

The use of four modulation durations of 8 time intervals allows implementation of a thermometer bit modulation scheme as disclosed in the MegaMod patents. The use of thermometer bits that are always populated in a specific order with respect to increasing brightness helps mitigate common pulse width modulation effects such as dynamic false contours. The lesser bits are binary weighted with durations 1, 2, and 4 represented. One of the segments with a duration of 8 may be considered binary weighted, but it is not necessary to choose a particular one in advance.

FIGS. 6C and 6D depict a series of time slots, during each of which an individual row write action takes place, which together form one time interval in which a modulation sequence is applied to an array. The time interval corresponds to time interval 1 of FIGS. 6A and 6B. A single row write action takes place during each time slot. This illustrates that in practice the row write actions of each time interval take place according to a predetermined scheme in which a first row write action takes place first, after which a second takes place until all thirteen have been written. In the predetermined scheme, each write pointer has a position in the sequence that never varies, even if a later write pointer is pointing data to a row that is located above the rows pointed to by write pointers earlier in the sequence.

One issue in the modulation of an array of emissive elements using the techniques described is maintaining the accuracy of the gray scale modulation. The is particularly a problem when the number of rows on the array is relatively small. One approach to this is to operate the system controller for a larger number of rows than are physically present on the array. In order to keep the approach manageable, a number of the row write actions may be directed to phantom rows. At least two different implementations are envisioned.

In a first embodiment, the time required to write to the phantom row is simulated through the use of a no-op (no operation) of the same approximate duration as a row write action. Implementations that can achieve this delay through use of a time delay line have been previously proposed by applicant in U.S. patent application Ser. No. 10/413,649, now U.S. Pat. No. 7,443,374, in FIGS. 12D-12F and associated text. U.S. Pat. No. 7,443,374 is incorporated herein in its entirety by reference. Other implementations are envisioned, In a second embodiment, at least one dummy row is designed into the array that does not control any emissive devices but that replicates the time required to write a fully functional row by replicating the circuitry of the active rows without the emissive elements. A plurality of dummy rows may be implemented. This dummy row or rows is addressed during the time where a no-op is desired. In FIGS. 7A-9D of the present application, the term no-op for the row to be written to indicates that the addressed row is handled as either a dummy row or as a time delay equivalent to a dummy row. In those instances where a range of virtual rows is associated with a no-op action, each of those rows is the subject of a separate no-op action as described in this paragraph.

The advantage of this approach is that each row write action is placed early in a sequence and is followed by a fixed number of no-op actions. Because the no-op actions change nothing, the time that the array stays in its current data state is determined by the number and duration of those no-op actions. In a simple case where the array is written top to bottom or bottom to top, this effectively extends the time required to write the entire array and thus the duration of the output of each emissive element placed in an on state, The virtual rows also represent the temporal order in which data is written to the actual rows and in which the no-op actions are executed when data is not written to an actual row.

FIG. 7A depicts a first example of the output of a row write sequence in which valid row write actions are separated by no-op intervals as described in the preceding paragraphs. In this example, a binary modulation sequence of 1024 modulation levels (0-1023), corresponding to $2^{10}$ bit depth, is mapped onto an array comprising 82 rows (0-81.) Each of the modulation steps is referred to as a Virtual Row and each row of the array is termed an Array Row. A virtual row is associated with each array row, with virtual rows associated with eleven no-op row write actions in between each array row. Virtual row 0 is associated with array row 0 and virtual rows 1-11 are no-op actions. Virtual row 12 is associated with array row 1 and virtual rows 12-23 are no-op actions. The implementation continues in this manner until virtual row 972 is mapped to array row 81. The mapping of virtual rows 973-983 maps to no-op row or rows eleven times. Virtual rows 984-1023, comprising 40 excess rows is necessary because 1024 does not map into 82 rows evenly.

If the number of array rows were 85 rather than 82 as shown in FIG. 7A in the section marked alternative, then a last virtual row 1008 would map to array row 84 followed by virtual rows 1009-1019 mapped to no-op actions. This would reduce the number of excess rows in the modulation mapping to four, comprising virtual rows 1020-1923. The number of rows in an array of emissive elements is most often selected for reasons other than mathematical convenience.

FIG. 7B depicts a second example of the output of a row write sequence in which valid row write actions are associated with no-op actions as described above. In this example, a binary modulation sequence of 512 modulation levels (0-511), corresponding to $2^9$ bit depth, is mapped onto an array comprising 82 rows (0-81.) Virtual rows and array rows are defined as in FIG. 7A. Virtual row 0 is associated with array row 0 and virtual rows 1-5 are associated with no-op actions. Virtual row 6 is associated with array row 1 and virtual rows 7-11 are associated with no-op actions. Virtual row 12 is associated with array row 2, and so forth until virtual row 486 is associated with array row 81 and virtual rows 487-495 are associated with no-op actions. Virtual rows 492-511 are excess virtual rows associated with no-op actions. If the number of array rows were 85 rather than 82 as shown in FIG. 7B in the section marked alternative, then a last virtual row 504 would be associated with array row 84 followed by virtual rows 505-509 associated with no-op actions. This would reduce the number of excess rows in the modulation mapping to two rows, comprising virtual rows 510-511. These rows are also mapped as no-op actions.

One of the problems with linear row progression modulation schemes where the modulation comprises a single write pointer that progresses from the top row to the bottom row or from the bottom row to the top row is that any structure in the modulation data becomes readily apparent. This type of modulation has been used successfully in analog displays, such as flat panel displays that rely on analog modulation of a liquid crystal material. However, binary weighted modulation of liquid crystal materials or of emissive devices is another matter. Applicant's use of the modulation techniques described in the MegaMod patents has overcome this limitation but this approach is more complex to implement than other methods in that it requires the use of row addressing circuitry and also means in a controller circuit to take desired intensity levels for each emissive element and create a modulation file comprising multiple write pointers that implements that desired intensity level.

Figure 8C:
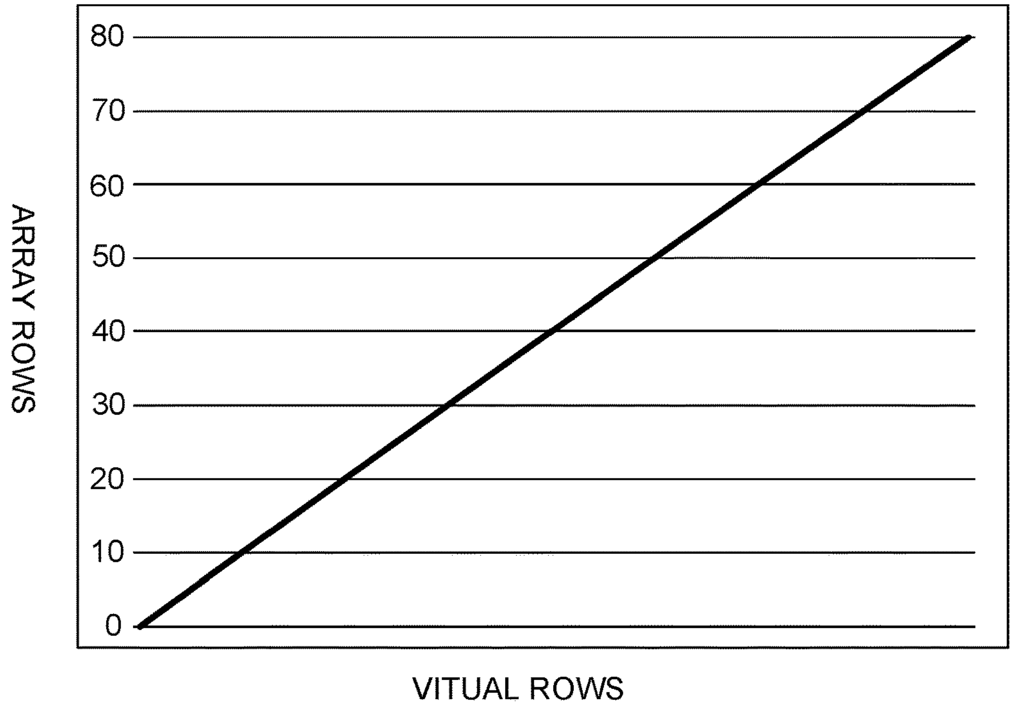
FIG. 8C presents a plot of the linear mapping scheme of FIG. 8A.

In FIGS. 8A-8D applicant discloses an alternative approach that possesses many of the advantages of the two approaches in randomizing the placement of data on the array. FIG. 8A presents a modulation sequence using the virtual row—array row arrangement disclosed with respect to FIGS. 7A and 7B. The arrangement using 82 rows numbered 0-81 is retained although the number of virtual rows is reduced. Virtual row 0 is associated with array row 0 and virtual row 1 is associated with a no-op action. Virtual row 2 is associated with array row 1 and virtual row 3 is associated with a no-op action. This continues until virtual row 162 is associated with array row 81 and virtual row 163 is associated with a no-op action. Virtual rows 164-180 are associated with no-op actions. The presence of these last virtual rows is not of overriding important as the virtual row sequence may be terminated at another point.

FIG. 8B depicts an example of a mapping where the virtual rows are associated with random array rows. In this example virtual row 0 is associated with array row 79 and virtual row 1 is associated with a no-op action. Virtual row 2 is associated with array row 24 and virtual row 3 is associated with a no-op action. Virtual row 4 is associated with array row 39 and virtual row 5 is associated with a no-op action. This continues in this manner until all array rows have been associated with a virtual row.

FIG. 8C presents a plot of the array rows (vertical axis) as a function of virtual rows (horizontal axis.) All virtual rows associated with no-op actions are omitted so the resulting plot reveals the highly linear nature of the arrangement between virtual rows and array rows.

Figure 8D:
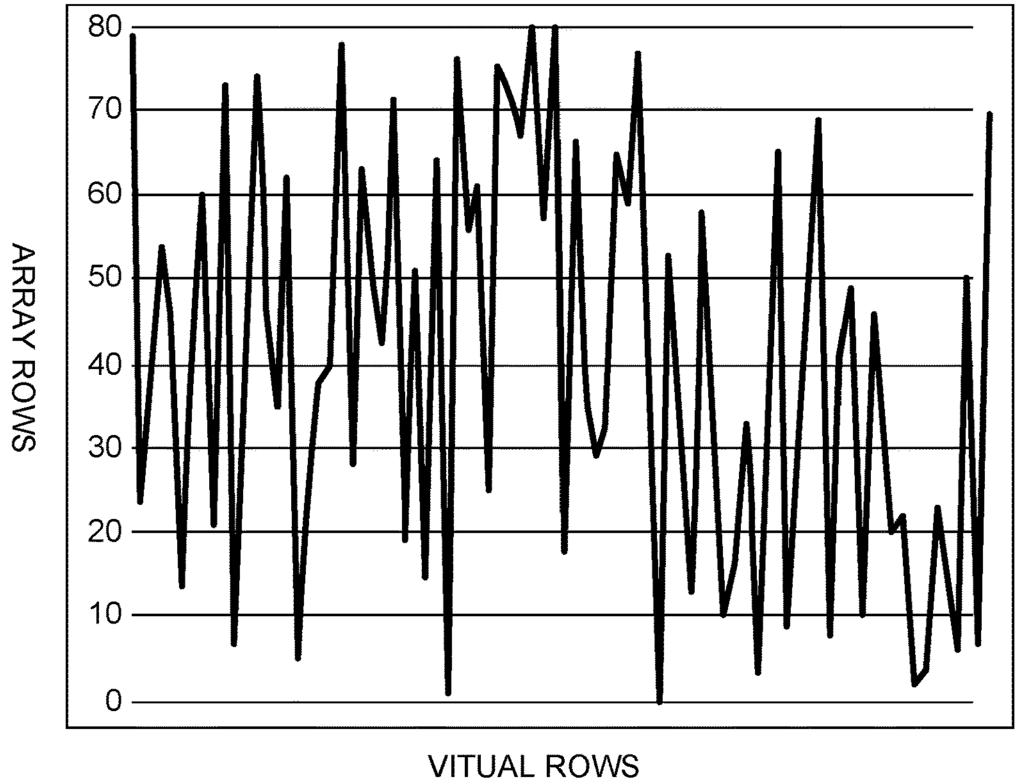
FIG. 8D presents a plot of the nonlinear and random mapping scheme of FIG. 8B.

The nature of a random mapping is illustrated by FIG. 8D, which depicts a plot of the array rows (vertical axis) of FIG. 8B as a function of the virtual rows (horizontal axis.) All no-op actions are deleted.

In comparing FIGS. 8C and 8D, it is easy to understand that any visual structures associated with the linear placement of data on the rows of the array shown in FIG. 8C would be substantially randomized in the mapping depicted in FIG. 8D.

Figure 9C:
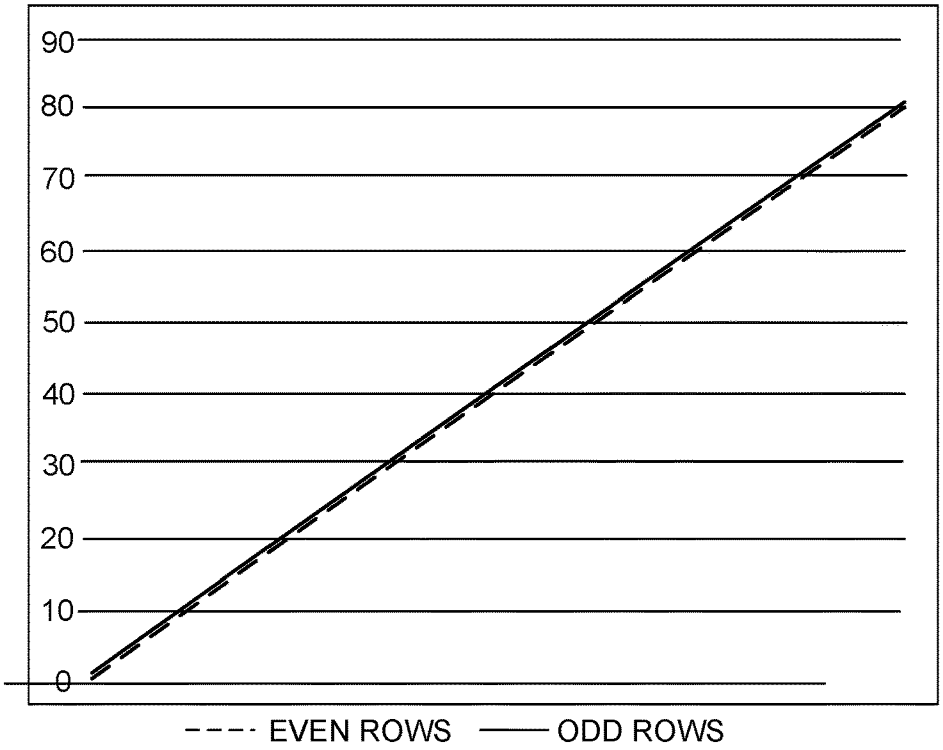
FIG. 9C presents a plot of the linear mapping scheme of FIG. 9A.

FIGS. 9A-9D compare two bit plane mappings wherein a bit plane mapping associates each virtual row with two array rows, one for even numbered rows and one for odd numbered rows, and for each, with no-op actions. FIG. 9A presents a first bit plane mapping wherein the relationship between the virtual rows that map to array rows is highly linear. Virtual row 0 is associated with even numbered row 0 and with odd numbered row 1. Virtual row 1 is associated with even numbered row 2 and odd numbered row 3. Virtual row 2 is associated with no-op actions on both even and odd numbered rows. The pattern repeats itself for virtual rows 3, 4 and 5, and so on, until virtual row 60 is associated with even numbered row 80 and odd numbered row 81. Virtual row 61 is associated with a no-op operation as are virtual rows 62 and 63.

FIG. 9B presents a second bit plane mapping wherein the relationship between the virtual rows that map to array rows is highly nonlinear and random. The even and odd numbered rows to which a virtual row may map are independently nonlinear and random. Virtual row 0 maps to even FIG. 9C presents a plot of the bit plane mapping disclosed in FIG. 9A with virtual rows plotted on the horizontal axis and array rows plotted on the vertical axis. The plot of the even numbered rows, represented by a dashed line, are parallel to a plot of the odd numbered rows, represented by a solid line. For simplification, the virtual rows associated with no-op actions are not presented. The result is highly linear and any underlying structure in the modulation data would be obvious.

Figure 9D:
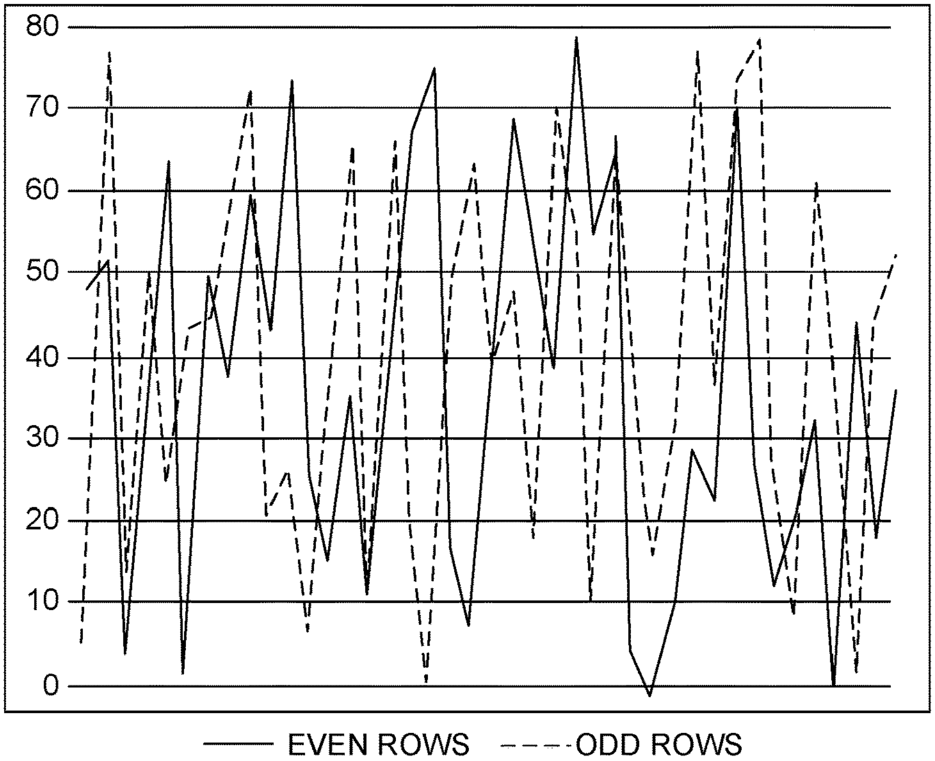
FIG. 9D presents a plot of the nonlinear and random scheme of FIG. 9B.

FIG. 9D presents a plot of the bit plane mapping disclosed in FIG. 9B. Now the array rows associated with the virtual rows for even numbered rows and odd number rows are dissociated and highly random. This represents a substantial improvement in randomness over the linear arrangement depicted in FIG. 9C. This degree of randomness can be implemented through a lookup table.

Bandwidth limitations occur in several different manners. One limitation exists in the ability to transfer information from external sources to the microdisplay/controller system described in paragraphs 1A-1B. A second limitation exists in the speed with which the controller can receive the information and convert it to the needed format for further action. A third limitation exists in the speed with which the information in the desired format can be applied to the backplane forming part of the array of emissive devices. This application recognizes these requirements and addresses a set of them.

FIG. 10 presents a comparison of two different modulation sequences. In one embodiment, the backplane requires a periodic test signal to be sent to verify the configuration of the backplane. This test signal is required periodically but not necessarily for every instance of the modulation sequence. In selected instances, the test signal time slot may be periodically repurposed to supply modulation data. A part of the backplane, normally a row, may be placed in test mode through an Op Code, a signal delivered to the backplane from an external or internal controller circuit.

A top level inspection of the left hand columns under the header Bit Plane Table×1 Yielding 1024 bits (hereafter the x1 columns) reveals a comprehensive modulation sequence that represents a 10 bit gray scale sequence is presented. The modulation sequence comprises 14 modulation steps that combine seven binary weighted bit planes lsb0-lsb5 with seven equally weighted thermometer bits thm0-thm6. The equally weighting thermometer bits are fully disclosed in the MegaMod patents, that are incorporated herein by reference. As noted earlier, the thermometer bits may be unequally weighted if needed to accomplish the desired modulation.

Accomplishing this in one sequence may be preferred in some instances, but it is also important to consider the overall bandwidth requirements to do so. The assumption is made that alternative modulation sequences may be used instead of those specifically disclosed below that otherwise comply with the principles of the modulation sequences disclosed herein.

The right hand columns under the header Bit Plane Table x4 Yielding 1024 bits (hereafter the x4 columns) disclose an alternative approach to the required resolution. The first consideration is that the left hand x1 columns results at the required modulation at some bandwidth requirement. While it is possible to operate the sequence at 1× it is also understood that this may necessary to be implemented at multiples of the proposed values to eliminate all the visual artifacts.

The approach disclosed in the right hand x4 columns reduces some of the bandwidth requirement by reducing the number of lsb segments from 6 to 4. The eliminated lsb segments are the lowest order bits representing 1 and 2 bit weightings, capable of representing 0 to 3 in integer terms. The key to recovery of the lost bit weightings is to repurpose the test bit during the intervals during which it is not needed in test mode. In the 4× example, only one test bit is needed during the four repetitions of the modulation sequence. Thus the other three instances of the test bit can be repurposed to convey image data. Three lsb instances can convey weightings of 0, 1, 2 or 3 as indicated in the table below.

| State | Weight |
|---|---|
| 0 of 3 | 0 |
| 1 of 3 | 1 |
| 2 of 3 | 2 |
| 3 of 3 | 3 |

Note that for a bit weighting of 1 or 2, the position in the four repetitions of the x4 columns sequence may vary. During the test sequence, the data value of the test bit is always set to 0 and therefore does not affect the resulting gray scale sequence.

In an instance where a test bit is not required during operation of the array and is therefore not a part of the sequence, it would be possible to operate the array in a manner similar to the previously described manner with the state alternatives now ranging from 0 of 4 to 4 of 4. This will increase the bit depth by one bit.

Those of skill in the art will recognize that various combinations of the embodiments disclosed herein may be combined to provide an effective modulation scramble device. For example, the even and odd column structure of FIG. 4A could be combined with the randomness of FIG. 7B. It is anticipated that many such combinations may be identified.

What is claimed is:

1. A display comprising:

an array of emissive elements including a plurality of rows and a plurality of columns; and a backplane including:

a plurality of pixel drive circuits configured to respectively and independently drive the emissive elements of the array of emissive elements;

a first row decoder including a first plurality of row decoder circuits, a row decoder circuit of the first plurality of row decoder circuits being configured to drive pixel drive circuits for a first subset of the plurality of columns in correspondence with a first modulation sequence; and a second row decoder including a second plurality of row decoder circuits, a row decoder circuit of the second plurality of row decoder circuits being configured to drive pixel drive circuit for a second subset of the plurality of columns in correspondence with a second modulation sequence, the second subset of the plurality of columns being different than the first subset of the plurality of columns, and the second modulation sequence being different than the first modulation sequence.

2. The display of claim 1, wherein:

the plurality of columns includes a plurality of odd columns and a plurality of even columns;

the first subset of the plurality of columns includes the plurality of odd columns; and the second subset of the plurality of columns includes the plurality of even columns.

3. The display of claim 1, wherein the second modulation sequence is 180 degrees out of phase with the first modulation sequence.

4. The display of claim 1, wherein:

the first modulation sequence includes a first plurality of sequential write pointers; and the second modulation sequence includes a second plurality of sequential write pointers.

5. The display of claim 4, wherein:

temporal spacing of the first plurality of sequential write pointers; and temporal spacing of the second plurality of sequential write pointers is monotonic.

6. The display of claim 1, wherein the first row decoder further includes a third plurality of row decoder circuits, a row decoder circuit of the third plurality of row decoder circuits being configured to drive pixel drive circuits for a third subset of the plurality of columns in correspondence with a third modulation sequence, the third modulation sequence being different than the first modulation sequence and the second modulation sequence.

7. The display of claim 6, wherein the second row decoder further includes a fourth plurality of row decoder circuits, a row decoder circuit of the fourth plurality of row decoder circuits being configured to drive pixel drive circuits for a fourth subset of the plurality of columns in correspondence with a fourth modulation sequence, the fourth modulation sequence being different than the first modulation sequence, the second modulation sequence, and the third modulation sequence.

8. The display of claim 7, wherein:
the second modulation sequence is 90 degrees out of phase from the first modulation sequence;
the third modulation sequence is 180 degrees out of phase from the first modulation sequence; and
the fourth modulation sequence is 270 degrees out of phase from the first modulation sequence.

9. The display of claim 7, wherein the first modulation sequence includes a first plurality of sequential write pointers.

10. The display of claim 9, wherein:
the second modulation sequence includes a second plurality of sequential write pointers;
the third modulation sequence includes a third plurality of sequential write pointers; and
the fourth modulation sequence includes a fourth plurality of sequential write pointers.

11. A method of operating a display having an array of emissive elements including a plurality of rows and a plurality of columns, the method comprising:
driving, with a first plurality of row decoder circuits included in a first row decoder, respective pixel drive circuits for a first subset of the plurality of columns, the respective pixel drive circuits for the first subset of the plurality of columns being driven in correspondence with a first modulation sequence; and
driving, with a second plurality of row decoder circuits included in a second row decoder, respective pixel drive circuits for a second subset of the plurality of columns, the respective pixel drive circuits for the second subset of the plurality of columns being driven in correspondence with a second modulation sequence,
the respective pixel drive circuits for the first subset of the plurality of columns and the respective pixel drive circuits for the second subset of the plurality of columns being included in a plurality of pixel drive circuits configured to respectively and independently drive the emissive elements of the array of emissive elements,
the second subset of the plurality of columns being different than the first subset of the plurality of columns, and
the second modulation sequence being different than the first modulation sequence.

12. The method of claim 11, wherein:
the plurality of columns includes a plurality of odd columns and a plurality of even columns;
the first subset of the plurality of columns includes the plurality of odd columns; and
the second subset of the plurality of columns includes the plurality of even columns.

13. The method of claim 11, wherein the second modulation sequence is 180 degrees out of phase with the first modulation sequence.

14. The method of claim 11, wherein:
driving the respective pixel drive circuits for the first subset of the plurality of columns with the first modulation sequence includes driving the respective pixel drive circuits for the first subset of the plurality of columns with a first plurality of sequential write pointers; and
driving the respective pixel drive circuits for the second subset of the plurality of columns with the second modulation sequence includes driving the respective pixel drive circuits for the second subset of the plurality of columns with a second plurality of sequential write pointers.

15. The method of claim 14, wherein:
temporal spacing of the first plurality of sequential write pointers is monotonic; and
temporal spacing of the second plurality of sequential write pointers is monotonic.

16. The method of claim 11, further comprising:
driving, with a third plurality of row decoder circuits included in the first row decoder, respective pixel drive circuits for a third subset of the plurality of columns, the respective pixel drive circuits for the third subset of the plurality of columns being driven in correspondence with a third modulation sequence that is different than the first modulation sequence and the second modulation sequence.

17. The method of claim 16, further comprising:
driving, with a fourth plurality of row decoder circuits included in the second row decoder, respective pixel drive circuits for a fourth subset of the plurality of columns, the respective pixel drive circuits for the fourth subset of the plurality of columns being driven in correspondence with a fourth modulation sequence that is different than the first modulation sequence, the second modulation sequence, and the third modulation sequence,
wherein the second row decoder further includes a fourth plurality of row decoder circuits, a row decoder circuit of the fourth plurality of row decoder circuits being configured to drive pixel drive circuits for a fourth subset of the plurality of columns in correspondence with a fourth modulation sequence, the fourth modulation sequence being different than the first modulation sequence, the second modulation sequence, and the third modulation sequence.

18. The method of claim 17, wherein the second modulation sequence is 90 degrees out of phase from the first modulation sequence.

19. The method of claim 18, wherein:
the third modulation sequence is 180 degrees out of phase from the first modulation sequence; and
the fourth modulation sequence is 270 degrees out of phase from the first modulation sequence.

20. The method of claim 17, wherein:
the first modulation sequence includes a first plurality of sequential write pointers;
the second modulation sequence includes a second plurality of sequential write pointers;
the third modulation sequence includes a third plurality of sequential write pointers; and
the fourth modulation sequence includes a fourth plurality of sequential write pointers.

* * * * *